(12) United States Patent
Pandey et al.

(10) Patent No.: US 9,275,093 B2
(45) Date of Patent: *Mar. 1, 2016

(54) INDEXING SENSOR DATA

(75) Inventors: Manoj Kumar Pandey, Milpitas, CA (US); Tarun Banka, Milpitas, CA (US); Debojyoti Dutta, Santa Clara, CA (US); Mainak Sen, Fremont, CA (US); Raja Suresh Krishna Balakrishnan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/016,945

(22) Filed: Jan. 28, 2011

(65) Prior Publication Data

US 2012/0197898 A1 Aug. 2, 2012

(51) Int. Cl.
*G06F 7/00* (2006.01)
*G06F 17/30* (2006.01)
(Continued)

(52) U.S. Cl.
CPC .......... *G06F 17/30333* (2013.01); *H04L 67/12* (2013.01); *H04L 67/16* (2013.01); *H04W 28/065* (2013.01); *H04W 84/18* (2013.01)

(58) Field of Classification Search
CPC ............... G06F 17/30333; G06F 17/30156; G06F 17/30336; G06F 17/30324; G06F 17/30864; G06F 17/3087; G06F 15/173; G06F 15/177; G06F 15/16; G06F 17/30321; G06F 17/30327; G06F 17/3074; G08C 19/04; G06Q 50/00; G06Q 10/00; H04W 28/068; H04W 84/18; H04L 67/16; H04L 67/12; H04L 67/125

USPC .................................. 707/741, 957, 959, 795
See application file for complete search history.

(56) References Cited

U.S. PATENT DOCUMENTS 5,004,399 A 4/1991 Sullivan et al.
5,093,916 A 3/1992 Karp et al.
(Continued)

FOREIGN PATENT DOCUMENTS

WO WO 2008/068126 6/2008

OTHER PUBLICATIONS

Wu et al., "Towards Integrated and Efficient Scientific Sensor date Processing: A Database Approach". EDBT Mar. 24-26, 2009.*
(Continued)

*Primary Examiner* — Daniel Kuddus
(74) *Attorney, Agent, or Firm* — Baker Botts L.L.P.

(57) ABSTRACT

In particular embodiments, a method includes, from an indexer in a sensor network, accessing a set of sensor data that includes sensor data aggregated together from sensors in the sensor network, one or more time stamps for the sensor data, and metadata for the sensor data identifying one or more pre-determined attributes of the sensor data. The method includes, at the indexer, generating an index of the set of sensor data according to a multi-dimensional array configured for querying of the set of sensor data along with a plurality of other sets of sensor data. One or more first ones of the dimensions of the multi-dimensional array include time, and one or more second ones of the dimensions of the multi-dimensional array include one or more of the pre-determined sensor-data attributes. The method includes, from the indexer, communicating the index of the set of sensor data for use in responding to one or more queries of the set of sensor data along with a plurality of other sets of sensor data.

20 Claims, 6 Drawing Sheets

(51) Int. Cl.
*H04L 29/08* (2006.01)
*H04W 28/06* (2009.01)
*H04W 84/18* (2009.01)

(56) References Cited

U.S. PATENT DOCUMENTS

| | | | |
|---|---|---|---|
| 5,442,449 A | 8/1995 | Stemmle et al. | |
| 5,457,987 A | 10/1995 | Bulou et al. | |
| 5,485,161 A | 1/1996 | Vaughn | |
| 5,488,285 A * | 1/1996 | Hosobuchi | 320/116 |
| 5,541,662 A * | 7/1996 | Adams et al. | 348/460 |
| 5,548,637 A | 8/1996 | Heller et al. | |
| 5,562,354 A | 10/1996 | Aizawa et al. | |
| 5,585,620 A * | 12/1996 | Nakamura et al. | 250/208.1 |
| 5,602,377 A * | 2/1997 | Beller et al. | 235/462.15 |
| 5,617,209 A * | 4/1997 | Svetkoff et al. | 356/608 |
| 5,727,536 A | 3/1998 | Kato | |
| 5,727,538 A | 3/1998 | Ellis | |
| 5,815,275 A * | 9/1998 | Svetkoff et al. | 356/608 |
| 5,847,260 A * | 12/1998 | Nagahara | 73/1.01 |
| 5,913,210 A | 6/1999 | Call | |
| 5,963,653 A | 10/1999 | McNary et al. | |
| 5,969,755 A * | 10/1999 | Courtney | G06F 17/3079 348/135 |
| 5,978,773 A | 11/1999 | Hudetz et al. | |
| 5,995,015 A | 11/1999 | DeTemple et al. | |
| 6,199,048 B1 | 3/2001 | Hudetz | |
| 6,311,214 B1 | 10/2001 | Rhoads | |
| 6,348,695 B2 * | 2/2002 | Okamuro et al. | 250/559.29 |
| 6,429,433 B1 | 8/2002 | Gagnon et al. | |
| 6,816,856 B2 * | 11/2004 | Baskins et al. | 1/1 |
| 6,904,385 B1 | 6/2005 | Budike, Jr. | |
| 7,027,580 B2 | 4/2006 | Gamble | |
| 7,079,464 B2 * | 7/2006 | Tsai | 369/53.28 |
| 7,120,590 B1 | 10/2006 | Eisen et al. | |
| 7,233,978 B2 | 6/2007 | Overton et al. | |
| 7,430,437 B2 | 9/2008 | Twitchell, Jr. | |
| 7,711,844 B2 * | 5/2010 | Schuehler et al. | 709/238 |
| 7,779,027 B2 * | 8/2010 | James et al. | 707/769 |
| 7,860,544 B2 * | 12/2010 | Say et al. | 600/347 |
| 7,890,518 B2 * | 2/2011 | Aasman | G06F 17/30587 706/12 |
| 7,937,651 B2 * | 5/2011 | Kelkar et al. | 715/223 |
| 2003/0084497 A1* | 5/2003 | Shiozaki | A41D 1/02 2/93 |
| 2003/0128897 A1* | 7/2003 | Lehrman | A45C 13/1046 383/2 |
| 2004/0112714 A1 | 6/2004 | Davaillon | |
| 2004/0140034 A1* | 7/2004 | Baudoin | B63B 7/085 152/512 |
| 2004/0187210 A1* | 9/2004 | Hickman | A47G 9/0261 5/482 |
| 2006/0064402 A1* | 3/2006 | Jung | H04L 67/12 1/1 |
| 2006/0161837 A1* | 7/2006 | Kelkar et al. | 715/505 |
| 2006/0235869 A1* | 10/2006 | Nagahashi et al. | 707/102 |
| 2007/0112714 A1* | 5/2007 | Fairweather | G06F 8/427 706/46 |
| 2007/0192351 A1 | 8/2007 | Liu et al. | |
| 2007/0220070 A1* | 9/2007 | Mazzagatti | G06F 17/30625 1/1 |
| 2007/0251835 A1* | 11/2007 | Mehta et al. | 205/783 |
| 2008/0021976 A1 | 1/2008 | Chen et al. | |
| 2008/0077619 A1 | 3/2008 | Gilley et al. | |
| 2008/0247313 A1 | 10/2008 | Nath et al. | |
| 2009/0006589 A1* | 1/2009 | Forbes | H04L 67/12 709/223 |
| 2009/0161837 A1* | 6/2009 | Killian | H04M 3/323 379/45 |
| 2009/0210373 A1* | 8/2009 | Yu et al. | 706/47 |
| 2010/0030718 A1* | 2/2010 | Anderson et al. | 706/47 |
| 2010/0125569 A1* | 5/2010 | Nair et al. | 707/722 |
| 2010/0125604 A1* | 5/2010 | Martinez et al. | 707/784 |
| 2010/0179930 A1 | 7/2010 | Teller et al. | |
| 2011/0285516 A1 | 11/2011 | Ritter | |
| 2011/0307599 A1 | 12/2011 | Saretto et al. | |
| 2012/0197898 A1* | 8/2012 | Pandey | H04L 67/12 707/741 |
| 2012/0197911 A1* | 8/2012 | Banka | G06F 17/30864 707/752 |

OTHER PUBLICATIONS

Li et al., "Multidimensional Range Queries in Sensor Networks", SenSys 2003. ACM. Akdere et al. "Data-Centric Visual Sensor Networks for 3D Sensing". EBrown University, RI. GSN 2006.*
Gandhi et al., "GAMPS: Compressing Multi Sensor Data by Grouping and Amplitude Scaling"; Sigmod 2009, ACM.*
Kurc et al. "Querying Very Large Mulri-dimensional Datasets in ADR". ACM/IEEE 2009. Cheng et al. , "Evaluating Probability Threshold k-Neighbor Queries over Uncertain Data", EDBT 2009.*
Scaglione et al., "On the Interdependence of Routing and Data Compression in Multi-Hop Sensor Networks", Wireless Network, 2005.*
Michel et al. "Discovering and Exploiting Keyword and Attribute-Value Co-occurrence to improve P2P Routing Indices", CIKM 2006.*
Li et al., "Multi-Dimensional Range Queries in Sensor Networks", ACM 2003.*
U.S. Appl. No. 13/016,938, filed Jan. 28, 2011, Debojuoti Dutta.
U.S. Appl. No. 13/016,942, filed Jan. 28, 2011, Tarun Banka.
U.S. Appl. No. 13/016,932, filed Jan. 28, 2011, Tarun Banka.
Tarun Banka, U.S. Appl. No. 13/016,932, Non-final Office Action dated Nov. 8, 2012
PCT Invitation to Pay Additional Fees and, Where Application, Protest fee for PCT/US2012/022831 mailed Jun. 19, 2012.
International Search and Written Opinion for PCT/US2012/022828 mailed May 21, 2012.
D. Dutta, U.S. Appl. No. 13/016,938, Non-final Office Action from U.S. Patent and Trademark Office dated Jan. 25, 2013.
T. Banka, U.S. Appl. No. 13/016,942, Non-final Office Action from U.S. Patent and Trademark Office dated Dec. 21, 2012.
T. Banka, U.S. Appl. No. 13/016,932, Response to Office Action filed with U.S. Patent and Trademark Office on Feb. . (Attorney's Docket 062891.3336). Feb. 05, 2013.
R.D. Merrill, "Representation of Contours and Regions for Efficient Computer Research," Communications of the ACM, Feb. 1973, vol. 16, No. 2. Feb. 1973.
Predic et al., "Developing Context Aware Support in Mobile GIS Framework," 9th AGILE Conference on Geographic Information Science, Hungary, 2006. 2006.
Rahman et al., "Context-Aware Social Networks mashup: A personalized Web Perspective," ©2010 IEEE.
Hara et al., "Data Replication for Top-k Query Processing in Mobile Wireless Sensor Networks," ©2010 IEEE.
International Search Report and Written Opinion re PCT/US2012/022828 dated May 21, 2012.
International Search Report and Written Opinion re PCT/US2012/022832 dated May 21, 2012.
PCT Invitation to Pay Additional Fees and, where applicable, Protest Fee mailed Jun. 19, 2012 regarding, Intl. Appln. No. PCT/US2012/022831 filed Jan. 27, 2012.
D. Dutta, U.S. Appl. No. 13/016,938, Response to Office Action mailed Apr. 25, 2013.
T. Banka, U.S. Appl. No. 13/016,942, Response to Office Action mailed Apr. 22, 2013.
Tarun Banka, U.S. Appl. No. 13/016,932, Final Office Action dated May 13, 2013.
International Search Report and Written Opinion for PCT/US2012/022831. Oct. 24, 2012.
M. K. Pandey, U.S. Appl. No. 13/016,945, Non-Final Office Action from U.S. Patent and Trademark Office, Aug. 1, 2013.
M. K. Pandey, U.S. Appl. No. 13/016,945, Response to Non-Final Office Action, Oct. 29, 2013.
M. K. Pandey, U.S. Appl. No. 13/016,945, Final Office Action from U.S. Patent and Trademark Office, Nov. 20, 2013.
T. Banka, U.S. Appl. No. 13/016,942, Non-Final Office Action from U.S. Patent and Trademark Office, Aug. 6, 2013.

(56) References Cited

OTHER PUBLICATIONS

T. Banka, U.S. Appl. No. 13/016,942, Response to Non-Final Office Action, Nov. 5, 2013.
Tarun Banka, U.S. Appl. No. 13/016,932, Request for Continued Examination, Aug. 9, 2013.
D. Dutta, U.S. Appl. No. 13/016,938, Non-Final Office Action from U.S. Patent and Trademark Office, Aug. 1, 2013.
Dutta, U.S. Appl. No. 13/016,938, Response to Non-Final Office Action, Oct. 29, 2013.
D. Dutta, U.S. Appl. No. 13/016,938, Final Office Action from U.S. Patent and Trademark Office, Nov. 20, 2013.
D. Dutta, U.S. Appl. No. 13/016,938, Response to Final Office Action, Feb. 20, 2014.
USPTO Advisory Action, D. Dutta, U.S. Appl. No. 13/016,938, Mar. 4, 2014.
D. Dutta, U.S. Appl. No. 13/016,938, RCE and Amendment Response, Mar. 19, 2014.
T. Banka, U.S. Appl. No. 13/016,942, RCE and Amendment Response, Feb. 26, 2014.
Request for Continued Examination (RCE) and Amendment Response filed Jul. 16, 2015.
Response to Non-Final Office Action dated Feb. 12, 2015.
Final Office Action dated May 26, 2015.
Notice of Allowance and Fee(s) Due dated Jun. 16, 2015.
Notice of Allowance and Fee(s) Due dated Aug. 31, 2015.
Non-Final Office Action dated Sep. 25, 2014.
Response to Non-Final Office Action dated Dec. 24, 2014.
Final Office Action dated Jan. 16, 2015.
Non-Final Office Action dated Nov. 12, 2014.

* cited by examiner

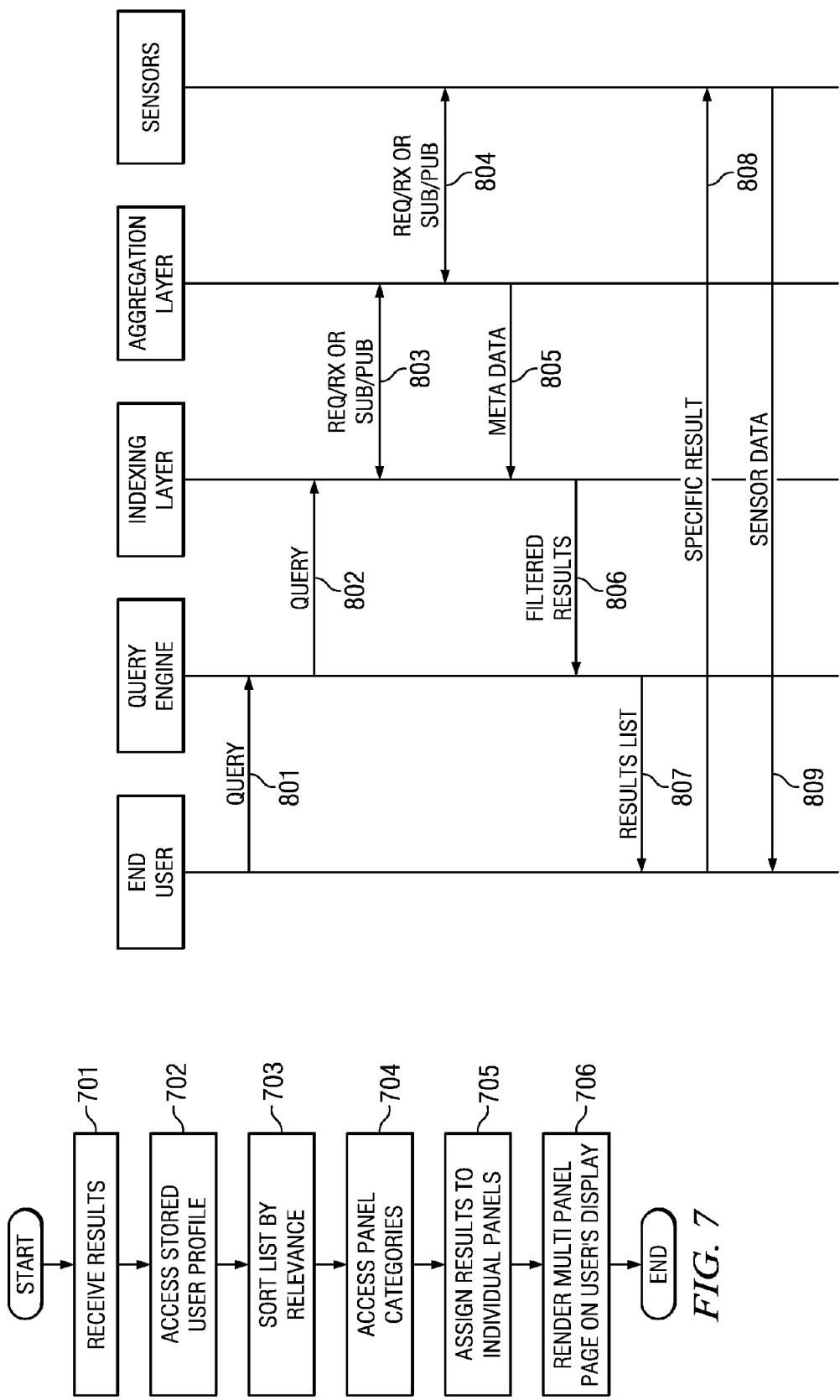

US 9,275,093 B2

INDEXING SENSOR DATA

TECHNICAL FIELD

This disclosure generally relates to sensor networks.

BACKGROUND

A sensor network may include distributed autonomous sensors. Uses of sensor networks include but are not limited to military applications, industrial process monitoring and control, machine health monitoring, environment and habitat monitoring, utility usage, healthcare applications, home automation, and traffic control. A sensor in a sensor network is typically equipped with a communications interface, a controller, and an energy source (such as a battery).

BRIEF DESCRIPTION OF THE DRAWINGS

FIG. 7 illustrates an example method for presenting sensor data retrieved in response to a sensor-data query.

FIG. 8 illustrates an example communication flow for collecting, aggregating, indexing, and querying sensor data.

DESCRIPTION OF EXAMPLE EMBODIMENTS

Overview

In particular embodiments, a method includes, from an indexer in a sensor network, accessing a set of sensor data that includes sensor data aggregated together from sensors in the sensor network, one or more time stamps for the sensor data, and metadata for the sensor data identifying one or more pre-determined attributes of the sensor data. The method includes, at the indexer, generating an index of the set of sensor data according to a multi-dimensional array configured for querying of the set of sensor data along with a plurality of other sets of sensor data. One or more first ones of the dimensions of the multi-dimensional array include time, and one or more second ones of the dimensions of the multi-dimensional array include one or more of the pre-determined sensor-data attributes. The method includes, from the indexer, communicating the index of the set of sensor data for use in responding to one or more queries of the set of sensor data along with a plurality of other sets of sensor data.

Description

Figure 1:
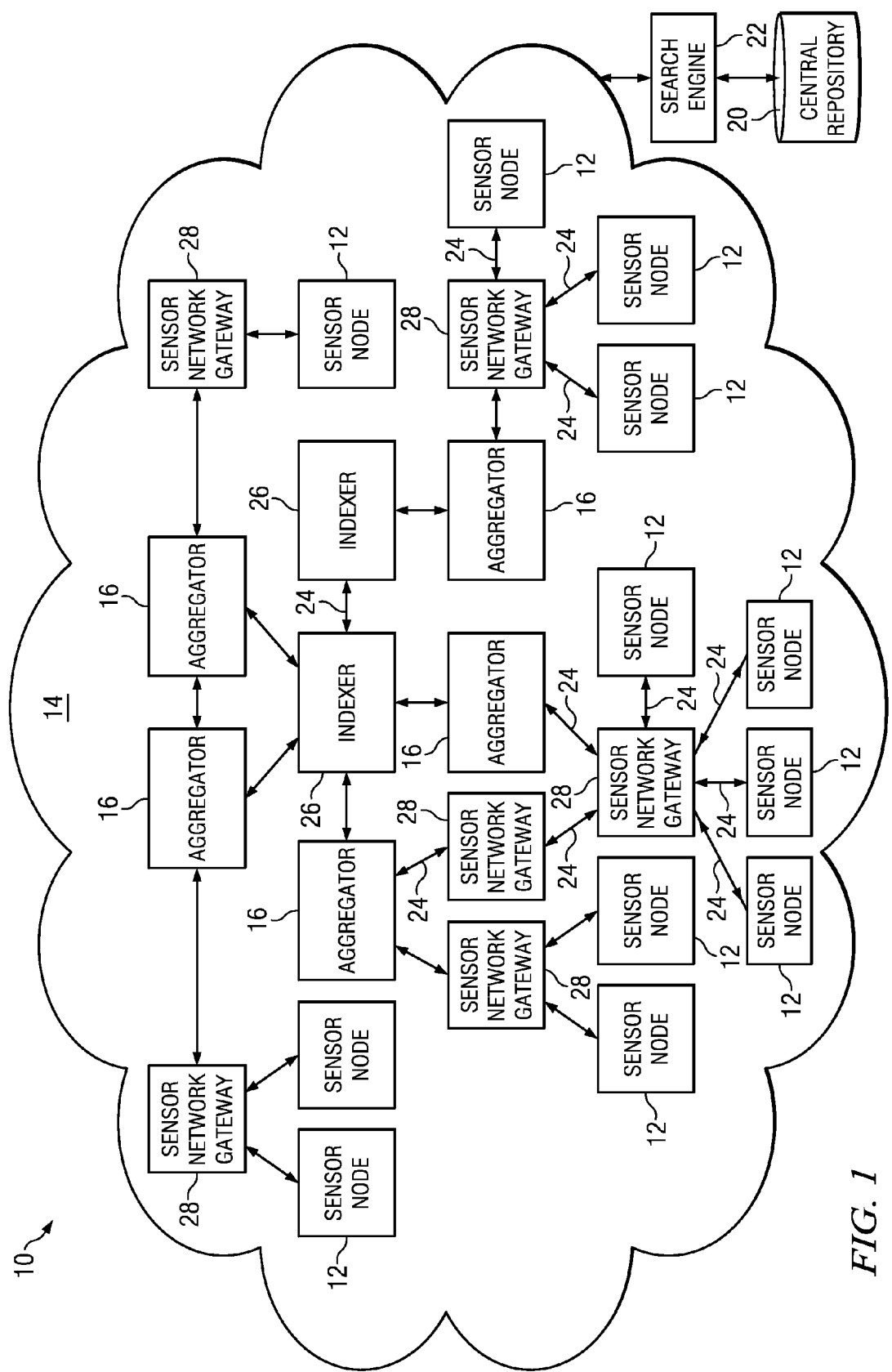
FIG. 1 illustrates an example sensor network.

FIG. 1 illustrates an example sensor network. Particular embodiments may facilitate operation of an "Internet of things," with a diverse group of sensors in a hierarchical, multi-sink sensor network. Sensor network 10 includes multiple sensor nodes 12 that collect sensor data, possibly from diverse geographic locations. The sensor nodes are connected via a communication network 14 including network links 24, and sensor-network gateways 28. In particular embodiments, each sensor node 12 communicates only with one sensor-network gateway 28. Each sensor-network gateway 28 may link together multiple sensor nodes 12. Sensor nodes 12 may be grouped together based on geographic or logical location, type of data, or other criteria. Each sensor-network gateway 28 may be connected via communication link 24 to one or more aggregator nodes 16. Aggregators 16, also called aggregation nodes 16, perform in-network processing of the raw sensor data and format the data into a format that may be more readily indexed by indexers 26. Indexers 26, (also called indexer nodes) provide to a search engine 22 information about what data is available at each aggregator node 16 (and therefore each sensor node 12 attached to aggregator node 16). End-users (not shown) may issue queries through search engine 22. Search engine 22 may generate a query from the user's inputs that takes advantage of the indexing format applied by indexer nodes 26. The query is routed to one or more indexer nodes 26, and each indexer 26 searches its own internal data store to find aggregator nodes 16 with matching data. In response, each indexer 26 returns the metadata of the sensor data matching the query or, alternatively, routes the query to another indexer 26 that may have data matching the query. In particular embodiments, central repository 20 stores various cached data related to query generation and response, such as popular queries, the results for popular queries, or end-user profiles. Central repository 20 and search engine 22 may alternatively be implemented by indexer nodes 26, or included in the communication network 14. Although this disclosure describes and illustrates a particular number of and arrangement among sensor network 10, sensor nodes 12, communication network 14, aggregator nodes 16, central repository 20, search engine 22, indexer nodes 26, and sensor-network gateways 28, this disclosure contemplates any suitable number of and arrangement among sensor network 10, sensor nodes 12, communication network 14, aggregator nodes 16, central repository 20, search engine 22, indexer nodes 26, and sensor-network gateways 28.

This disclosure contemplates any suitable communication network 14. As an example and not by way of limitation, one or more portions of communication network 14 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Communication network 14 may include one or more communication networks.

Sensor network 10 may include multiple sensor networks. Each sensor network communicates to the outside world through its sensor-network gateway 28. In particular embodiments, all data from individual sensor nodes 12 must pass through a sensor-network gateway 28 to reach an aggregator node 16. Each sensor-network gateway 28 may include a physical address, which may be longitude latitude coordinates of sensor-network gateway 28, or a radius of the physical area its sensor nodes 12 cover, and a logical address used for routing and addressing of data.

In particular embodiments each sensor-network gateway 28 implements a security policy using an access list that limits access to the data available from sensor network 10. Well-known symmetric key cryptography schemes may be used to initiate a secure session between end-users and sensor-network gateways 28 for data exchange. In this architecture, indexer nodes 26 may also be used as authentication servers (AS) to exchange secret keys for the session between end-users and the sensor network where data is available. This requires that end-users' private key and sensor networks' private key is known to the indexer (acting as an authentication server) where end-users search request finds a match for the desired data. A session key is sent back to the end-user that is exchanged with sensor network. This session key is used to exchange data between end-users and the sensor networks for the validity of the session key in a secured manner.

Sensor network 10 includes one or more sensor nodes 12. In particular embodiments, a sensor node 12 includes one or more devices that may measure or otherwise sense one or more physical quantities and convert the sensed physical quantities into or generate based on the sensed physical quantities one or more signals. Example physical quantities include but are not limited to chemical concentration, electrical fields, gravity, humidity, light, location, magnetic fields, motion, orientation, pressure, shear stress, sound, temperature, tension (or compression), torsion, and vibration. A signal may be a digital or analog electrical signal. Example sensor nodes 12 include but are not limited to an audio sensor, electricity meter, gas meter, Global Positioning System (GPS) locator, motion detector, potentiometer (which may, for example, operate as a fuel gauge), pressure sensor (which may, for example, operate as an altimeter, barometer, depth sensor, flow sensor, or leak sensor), still or video camera, thermometer, and water meter. In particular embodiments, sensor node 12 may include one or more sensor nodes 12 and may be unitary or distributed. Sensors may be static or mobile, connecting to various different sensor networks depending on where it is located, such as mobile phone. This disclosure contemplates any suitable sensor nodes 12.

In particular embodiments, one or more sensor nodes 12 each include one or more devices that may send, receive, or forward information (such as sensor data) over a communication channel, for example to one or more other sensor nodes 12 or other equipment in sensor network 10 or to aggregator nodes 16. In particular embodiments, sensor data are one or more signals that one or more sensor nodes 12 have converted one or more sensed physical quantities into or generated based on one or more sensed physical quantities. In particular embodiments, a sensor-data stream is a sequence of sensor data generated by a sensor node 12, which sensor node 12 may transmit more or less continuously as it generates the sensor data or periodically in batches. Reference to sensor data may encompass a sensor-data stream, and vice versa, where appropriate. Sensor data may relate to a sensor subject. This disclosure contemplates any suitable sensor subject. As an example and not by way of limitation, a sensor subject may be a person (or group of persons), place (such as for example a geographical location), thing (such as for example a building, road, or car model), concept, discipline, time period, event, field of study, interest, issue, knowledge base, topic, or other sensor subject. Sensor data or a sensor-data stream may relate to a sensor subject in any suitable way. As an example and not by way of limitation, sensor data may relate to a sensor subject because one or more sensor nodes 12 generated the sensor data from one or more stimuli produced by the sensor subject. As another example, sensor data may relate to a sensor subject because the sensor data may provide insight or further understanding of the sensor subject. As another example, sensor data may relate to a sensor subject because it may help detect or predict the occurrence of one or more problems or events concerning the sensor subject. As another example, sensor data may relate to a sensor subject because it may facilitate monitoring of the sensor subject.

In particular embodiments, when a sensor node 12 transmits sensor data, sensor node 12 may tag the sensor data or otherwise identify it as being related to a particular sensor subject. As an example and not by way of limitation, a sensor node 12 may have one or more sensor identifiers (IDs) and generate only particular sensor data related to a particular sensor subject. One or more sensor nodes 12 may be connected to a network (such as for example an Internet Protocol (IP) network) that assigns unique identifiers to each terminal node. A network host may assign an IP address to each sensor node 12, and the IP address assigned to sensor node 12 may provide a sensor ID for sensor node 12. As another example, one or more sensor nodes 12 may each have a network interface with a unique ID (such as for example a Media Access Control (MAC) address, an Ethernet hardware address (EHA) or another hardware address, an adapter address, or a physical address) and the unique ID of the network interface may provide a sensor ID for sensor node 12. As another example, geographic information about a sensor node 12 (such as for example the geographic location of sensor 201 as identified by the Global Positioning System (GPS)) may provide a sensor ID for sensor 201. As another example, one or more properties of a sensor node 12 (such as for example its sensor type) may provide a sensor ID for sensor node 12. When a sensor transmits sensor data that it has generated, sensor node 12 may transmit the sensor data along with one or more sensor IDs of sensor node 12. The present disclosure contemplates any suitable sensor IDs containing any suitable information. As an example and not by way of limitation, a sensor ID for a sensor node 12 may be a combination of two or more of the sensor IDs described above, where appropriate. Moreover, the present disclosure contemplates any suitable tags for sensor data. In other embodiments, to save power and processing resources, tagging is performed by aggregator nodes 16, and sensor nodes 12 do not perform tagging.

In particular embodiments, a sensor node 12 may have one or more resources for carrying out its functions. These resources may include but are not limited to processing capabilities, memory, and power. Sensor 12 may have one or more processors and one or memory devices. This disclosure contemplates sensor node 12 having any suitable number of any suitable processors and memory devices. Sensor 12 may have an internal power source (such as for example one or more rechargeable or replaceable batteries) or receive power from an external power source (such as for example an electrical grid). Sensor 12 may include one or more solar panels to provide power to it. This disclosure contemplates sensor nodes 12 having any suitable sources of power. Other resources of sensor node 12 may but need not in all cases include software, such as for example application software, middleware, system software, firmware, and device drivers. This disclosure contemplates sensor node 12 including any suitable resources for carrying out its functions. All sensor nodes 12 in sensor network 10 need not have the same resources; different sensor nodes 12 may have different resources. As an example and not by way of limitation, one or more first sensor nodes 12 may each have substantial processing capabilities, large amounts of memory, and almost unlimited power, while one or more second sensor nodes 12 may each have very limited processing capabilities, memory, and power. As another example, one or more first sensor nodes 12 may each have software running on them enabling them to perform a variety of functions (including higher-level ones such as tagging sensor data), while one or more second sensor nodes 12 may each have less or scaled-down software running on them enabling them to perform fewer functions (or only lower-level ones). This disclosure contemplates any suitable diversity in the resources available to sensor nodes 12 throughout system 10.

Although FIG. 1 illustrates a particular arrangement of sensor nodes 12, sensor-network gateways 28, aggregator nodes 16, indexer nodes 26, and search engine 22, this disclosure contemplates any suitable arrangement of sensor nodes 12, sensor-network gateways 28, aggregator nodes 16, indexer nodes 26, and search engine 22. Moreover, although FIG. 1 illustrates a particular number of sensor nodes 12, sensor-network gateways 28, aggregator nodes 16, indexer nodes 26, and search engine 22, this disclosure contemplates any suitable number of sensor nodes 12, sensor-network gateways 28, aggregator nodes 16, indexer nodes 26, and search engine 22. Any suitable connections may connect sensor nodes 12, sensor-network gateways 28, aggregator nodes 16, indexer nodes 26, and search engine 22.

In particular embodiments, an aggregator node 16 is a node in a system that collects sensor-data from a set of sensor nodes 12 (which may be a subset of all sensor nodes 12 in a sensor network 10). The set of sensor nodes 12 that an aggregator node 16 may collect sensor data from may, as an example and not by way of limitation, include sensor nodes 12 that are within a physical or logical neighborhood of aggregator node 16. An aggregator node 16 may include one or more computer systems (such as, for example, servers) and may be unitary or distributed. An aggregator node 16 may include one or more aggregator nodes 16. Aggregator node 16 may provide an infrastructure for collecting and aggregating data from sensor nodes 12. In particular embodiments, each aggregator node 16 is responsible for collecting sensor data from a set of sensor nodes 12 in its physical or logical neighborhood. Aggregator node 16 may collect and aggregate a particular set of data from the set of sensor nodes 12 or all sensor data generated by the set of sensor nodes 12. Each sensor node 12 may transmit a sensor-data stream to one or more aggregator nodes 16. As an example and not by way of limitation, each sensor node 12 may transmit a sensor-data stream to nearest aggregator node 16. A sensor node 12 may periodically inform one or more aggregator nodes 16 about the sensor data that it has generated or may update its aggregator node 16 only when deemed necessary. In particular embodiments, aggregator nodes 16 may operate hierarchically, such that an aggregator node 16 may collect data from one or more other aggregator nodes 16.

In particular embodiments, sensor network 10 uses a query-response infrastructure with programmable primitives. As an example and not by way of limitation, indexer nodes 26 may receive one or more queries (such as, for example, from a search engine 22) for real-time sensor data from particular subjects. Indexer nodes 26 may send one or more requests for the sensor data to aggregator nodes 16 and sensor nodes 12. This request may include information describing the query and instruction for how to aggregate the sensor data from sensor nodes 12. Sensor nodes 12 may then respond by transmitting the requested sensor data to aggregator nodes 16, which may aggregate the data and respond by transmitting the aggregated data to indexer nodes 26.

In particular embodiments, aggregator nodes 16 may be programmable to support any request or query for data from a search engine 22. In other embodiments, aggregator nodes 16 may have some pre-defined functions or macros over which aggregator nodes 16 may aggregate. As an example and not by way of limitation, macros may include wavelet, Fast Fourier Transform (FFT) decomposition, or other fingerprinting techniques. In particular embodiments, macros may be hardware accelerated in DSPs and FPGAs, such as FFT, enabling wire speed summarization.

In particular embodiments, an aggregator node 16 may aggregate sensor data using spatial factors. An aggregator node 16 may collect data from one or more sensor nodes 12 that are spatially nearby neighbors. Aggregator node 16 may then provide a statistical characterization of the sensor data generated by a set of sensor nodes 12. As an example and not by way of limitation, an aggregator node 16 may provide a mean, median, mode, standard deviation, Gaussian distribution, log-normal, other suitable characterization of the data, or two or more such characterizations of the data. Aggregator node 16 may collect and provide the statistical characterization of the data in real-time, and transmit this data to indexer nodes 26 in real-time.

In particular embodiments, an aggregator node 16 may aggregate sensor data using temporal factors. An aggregator node 16 may collect data from one or more sensor nodes 12 based on a time-series of the sensor data. Aggregator node 16 may then provide a statistical characterization of the sensor data generated by a set of sensor nodes 12. As an example and not by way of limitation, an aggregator node 16 may provide a moving average, or autoregressive or integrated or a combination of the aforementioned models. The time period over which aggregator node 16 may collect data may be any suitable finite time period. As an example and not by way of limitation, the time period may be a predefined window as defined by a query, request, macro, or function.

In particular embodiments, an aggregator nodes 16 may aggregate sensor data using both spatial and temporal factors. An aggregator node 16 may collect data from one or more sensor nodes 12 based both the spacial proximity of sensor nodes 12 and on the time-series of the sensor data. In particular embodiments, complex sensor data with multidimensional and temporal characteristics may be aggregated using multilinear algebraic techniques (such as, for example, tensor decomposition) and aggregator node 16 may only transmit key coefficients to indexer nodes 26.

In particular embodiments, indexer nodes 26 and aggregator nodes 16 use a publish-subscribe infrastructure with programmable primitives. As an example and not by way of limitation, a indexer node 26 may receive one or more queries (such as, for example, from a search engine 22) for real-time sensor data in a particular geographic area. Indexer nodes 26 28 may send one or more requests for the sensor data to aggregator nodes 16 and sensor nodes 12. This request may include information describing the query and instruction for how to aggregate the sensor data from sensor nodes 12. Sensor nodes 12 may then publish sensor data to aggregator nodes 16, which may aggregate the data and publish the data to indexer nodes 26. In particular embodiments, a user of search engine 22 may subscribe to indexer nodes 26 and may receive push notification of aggregated data at aggregator node 16 and statistical characterizations of sensor data from aggregator node 16.

Figure 2:
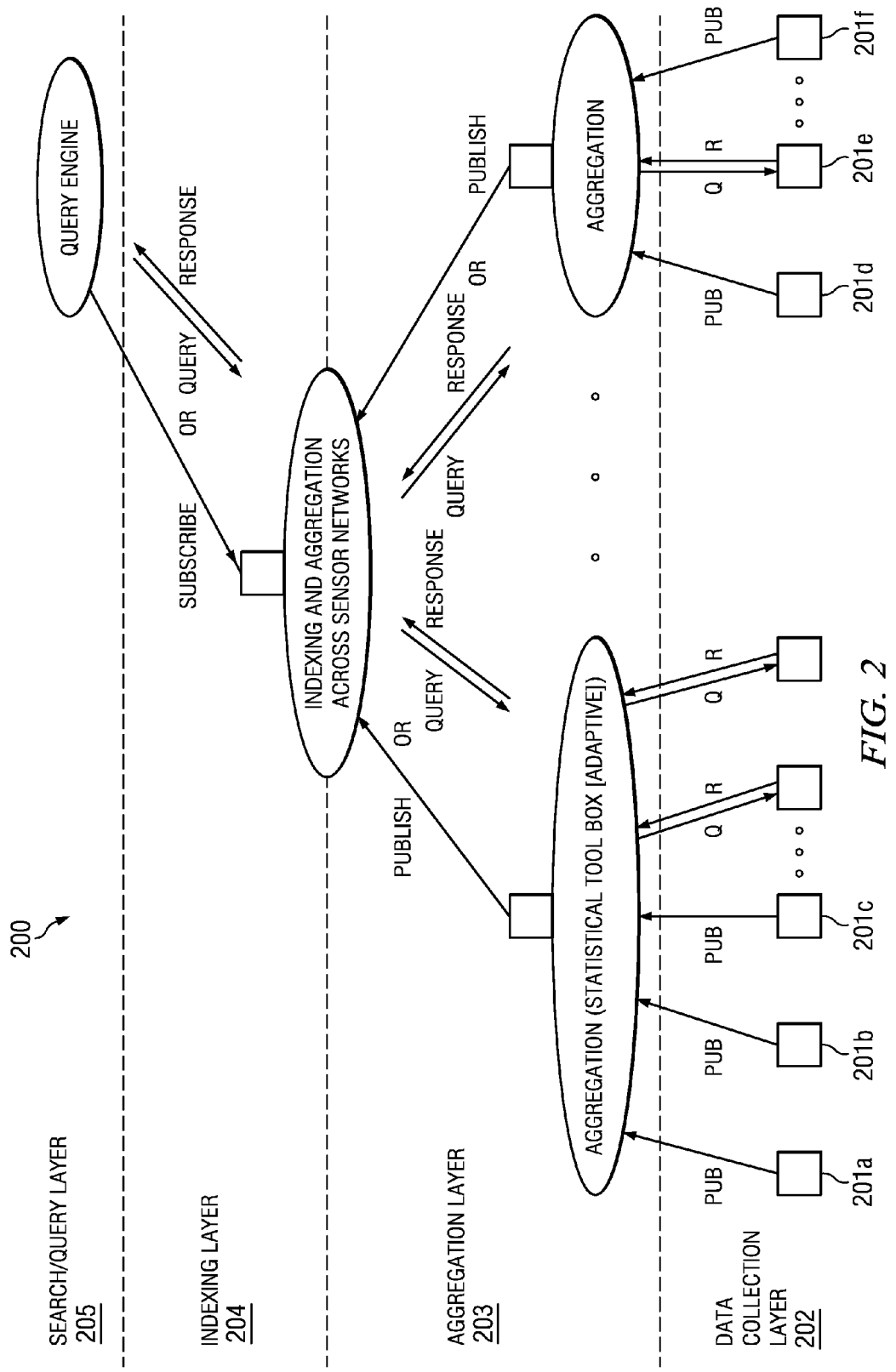
FIG. 2 illustrates an example hierarchy of example network layers for collecting, aggregating, indexing, and querying sensor data.

FIG. 2 illustrates an example hierarchy of example network layers for collecting, aggregating, indexing, and querying sensor data 200. At the lowest layer sits the data collection layer 201. The data collection layer 201 comprises a plurality of sensor networks 202a-f, each sensor network comprising a plurality of individual sensor nodes 12 and a sensor-network gateway 28.

Data collection layer 201 passes sensor data to aggregation layer 203. Aggregation layer 203 aggregates data from multiple sensor networks and performs in-network processing on the raw data. Aggregation layer 203 comprises a plurality of aggregator nodes 16, each aggregator node 16 connected to multiple sensor-network gateways 28. Aggregators 16 perform the bulk of processing of data, including eliminating redundant data through a serious of deduplication algorithms, data summarization and categorization, and data validation.

Aggregation layer 203 also generates metadata and formats the sensor data into a format which may be easily indexed for searching. Aggregation layer 203 may have multiple hierarchical levels; one aggregator 26 may be logically located below another aggregator node 16, and feed its aggregated data up to other aggregator nodes 16.

In particular embodiments, aggregation layer 203 may include one or more computer systems (such as for example servers) and may be unitary or distributed. Aggregation layer 203 may include one or more aggregator nodes 16. This disclosure contemplates any suitable aggregation layer 203. As an example and not by way of limitation, a sensor network may store sensor data and transmit it to aggregation layer 203 periodically in batches. As another example, sensor networks may continuously transmit sensor data to aggregation layer 203 as they generate the sensor data. As another example, sensor network may transmit sensor data to aggregation layer 203 after receiving a request for sensor data from, for example, aggregation layer 203, indexing layer 204, or the search-query layer 205. As another example, sensor networks may transmit sensor data to aggregation layer 203 after receiving an indication that one or more persons or entities (which may be a sensor subject of the sensor data) have consented to or authorized the transmission of the sensor data.

In particular embodiments, aggregation layer 203 may store, categorize, combine, and file data from one or more data streams from one or more sensor networks over time. In particular embodiments, aggregation layer 203 may combine and store data sets based on a variety of criteria. For example, aggregation layer 203 may combine data sets from a plurality of data streams based on a particular sensor subject, such as for example a specific person or group of persons the sensor is monitoring, a location or environment the sensor is monitoring, a type of sensor, a time period or event when the sensor recorded the data, other appropriate criteria, or a combination of two or more such criteria. As another example, aggregation layer 203 may combine data sets from a plurality of data streams based on time, such as for example by using a moving average or auto-regressive algorithm. As another example, aggregation layer 203 may combine data sets from a plurality of data streams based on the geography of sensor networks that generated the data streams, such as for example aggregating data based on the spatial correlation of sensor networks. As another example, aggregation layer 203 may combine data sets from a plurality of data streams based on predefined characteristics of the data streams, such as for example aggregating data based on a query, offer, or user-input that specifies a particular suitable characteristic that may serve as a basis for aggregation.

In particular embodiments, sensor networks may be probed periodically for sensor data. As an example and not by way of limitation, a query may be routed from a requesting system (such as search query layer 205, indexing layer 204, or aggregation layer 203) to one or more sensor nodes 12 in a sensor network. The sensor may respond by transmitting a data stream containing some or all of the data requested. Aggregation layer 203 may then store, categorize, combine, and file some or all of this data. Aggregation layer 203 may also transmit some or all of this data to one or more other systems, such as for example indexing layer 204 or search query layer 205. In particular embodiments, aggregation layer 203 may support publish-subscribe (pub-sub) communication paradigm. In such a publish-subscribe model, sensor nodes 12 blog data with authentication constraints to a pub-sub server. This server might do aggregate queries and might further send another publish message to another pub-sub server. In some embodiments, aggregator nodes 16 act as the pub-sub servers. Each pub-sub server acts as a heavy weight sensor node which does in-network processing based on policy engines. Since this system is hierarchical, and the pub-sub servers may form a topology that is resilient, it may scale to millions of sensor nodes 12. These pub-sub servers act as micro-sinks and could function as in-network content routers. A pub-sub protocol is open and universal like XMPP (Jabber) or Twitter.

Indexing layer 204 performs indexing of data aggregated by aggregation layer 203. Indexing layer 204 is comprised of any number of individual indexing nodes. Because each sensor data may comprise a real-time stream of data, searching data, even the summarized data from aggregation layer 203, is of little use to an end-user unless the data is indexed. Indexing layer 204 generates keywords and indices for the aggregated real-time data streams such that a stream of data is easily searched and identified by various criteria. Indexing layer 204 is also hierarchical; indexer nodes 26 may be connected to other indexer nodes 26 at different levels. Thus, query to a particular indexer may be routed from other indexer nodes 26 in indexing layer 204.

Indexing layer 204 receives queries from search-query layer 205. Queries may be generated by end-users at a search interface, such as a website, or generated automatically by applications residing on computing devices. For example, a user may request traffic and weather conditions along a route programmed into a GPS navigation device. The navigation device has an API allowing the navigation route to be entered as a query, and includes preformatted criteria requesting sensor data requesting traffic and weather conditions. Search-query layer 205 may be a separate network, or may be part of indexing layer 204. In response to the queries, indexer nodes 26 deliver a list of relevant aggregator nodes 16 (and therefore, sensor networks) serving the data matching the specifications of the query.

Every layer of system 200 may communicate data to the layer above it either through a subscribe/publish mechanism, or a request/receive model. For example, sensor nodes 12 in sensor networks may receive requests from a specific aggregator, and only transmit its collected sensor data in response to a request. Alternatively, a sensor network may receive a subscribe message from an aggregator, subscribing to all or a part of the sensor data collected by the sensor network. The subscribe message may specify continuous, periodic, or conditional data delivery. After the sensor network receives the subscribe message, it actively publishes collected sensor data to the subscribing aggregator pursuant to the timing specified in the subscribe message.

Particular embodiments may provide a standardized framework for the exchanges of sensor data. Sensor networks may communicate using any suitable data format, such as for example JAVASCRIPT Object Notation (JSON), YAML Ain't Markup Language (or Yet Another Markup Language) (YAML), Hierarchical Data Format (HDF), Ordered Graph Data Language (OGDL), Extensible Markup Language (XML), Extensible Messaging and Presence Protocol (XMPP), or other suitable formats. As an example and not by way of limitation, sensor nodes 12 in sensor network 200 may communicate sensor data using XML. Standardization may facilitate the interoperability among sensor networks, aggregation layer 203, indexing layer 204, and search and search-query layer 205. In particular embodiments, sensor data may be include definitions, categories, or other annotations in the header format of transport or routing protocols, and sensor nodes 12 may transmit one or more data streams using these options. These options may be identified by a type, relations, or subject, and may represent various sensor-related information.

Figure 3:
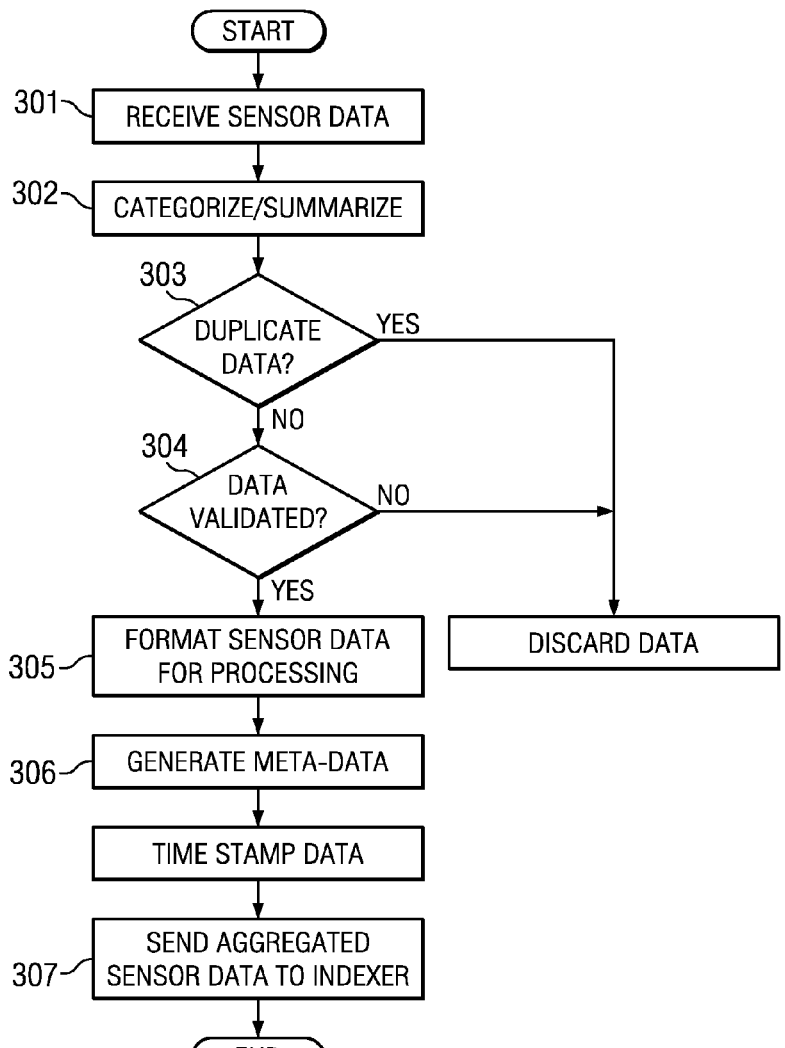
FIG. 3 illustrates an example method for aggregating sensor data.

FIG. 3 illustrates an example method for aggregating sensor data. Providing search to navigate and look-up sensor data is an important service; otherwise, it would simply be unscalable for end-users to retrieve relevant information from vast amount of sensor data. However, the vast amount of data presents a unique challenge for building a scalable sensor search system. An architecture to support such a system needs support from several design elements that may assist and interact with each other. The aggregator is the gateway through which raw sensor data travels outwards towards the end-user. The aggregator provides valuable services in terms of summarizing and filtering data, and publishing it to the other elements in the architecture. Thus, the primary responsibility of an aggregator node is to collect data from the sensor network and publish it to various indexer nodes.

At step 301, the aggregator receives sensor data from sensor-network gateways 28. In particular embodiments, sensor nodes are dumb, constantly feeding data through their sensor-network gateways 28 to aggregator nodes 16. In other embodiments, sensor-network gateways 28 execute a security policy as previously described. Regardless of the mechanism utilized by sensor-network gateways 28, their sensor data is sent to one or more aggregator nodes 16.

Initial data categorization and summarization occurs at step 302. Because data from sensor networks is likely untagged and in the form of a real-time data stream, the aggregator node must first categorize and summarize the incoming sensor data. Sensors produce huge amounts of data. For example, phones may continuously generate data about location, light intensity, sound, accelerometers, etc. However it is not energy efficient (and might be very hard) to store and process the raw data. Thus data reduction may be important. An aggregator may use multiple mechanisms to achieve this difficult goal.

In particular embodiments, metasense queries may be used to categorize and summarize sensor data. A metasense table represents a collection of related data. Aggregator nodes 16 use metasense queries to collect all data meeting a particular set of specifications into a table. Metasense queries may be represented by a language which may then be converted into a graph. Multi-sensor data is fed into small graph/state machines to generate aggregate data. For example, a query may define a rule: {Output(1) every 10 s whenever Mean (lightIntensity)>100 and Median(sound frequency >1 Khz.}. This rule broken down into a decision engine with a mean block that tracks mean (running average) and a comparator. Collectively the rule, comparator, and decision engine may form a programmable logic block and multiples of the programmable logic block could run in parallel at aggregator nodes 16, or alternatively, on the various sensor nodes 12. If a query string has parameters that belong to a metasense table, then all the records related to that metasense can be provided as a result. Thus multiple complex data streams may be reduced significantly.

In another embodiment, aggregator nodes may use a standardized sensor data format to ensure summarization. Sensor data may be divided into two types: (a) data that reports environment properties, like temperature, humidity, pollen-level, sunlight etc., where a type/value format should be sufficient, and (b) data that reports non-property based information like text/audio/video data, where a type/value format may not be used. For case (a) above, this may be an alternative to using metasense. Providing the aggregator with an ability to use standardized property-based data may be useful in many ways: first, it provides a uniform and consistent way to represent data globally for all sensor nodes 12, second, it provides a concise way to report/store data, third, it allows for easier indexing based on type, and finally, it allows for faster lookup for searches (for example, searching for a sensor data type). For non-standardized data, regular indexing is needed (based on header tag, frequency of occurrence of a keyword etc).

After the initial data categorization and summarization, data reduction is performed at step 303. Data deduplication is necessary because of the sheer amount of raw data being transmitted to aggregator nodes 16 by the sensor networks. Generally, it is beneficial for data reduction to occur as early as possible; i.e., at sensor nodes 12 themselves, because reducing data transmitted by individual sensor nodes 12 translates into handling less data at subsequent stages.

For property-based data, an aggregator 16 may analyze incoming data and communicate with the sensor network to enforce suppression of redundant data. On a need-basis, an aggregator may broadcast a control message asking transmission suppression to ensure that sensor nodes 12 do not transmit redundant data in the first place. For property-based transmissions (where type of sensor-data is standardized), if a set of nearby sensor nodes 12 transmit the same data (which may often be the case), then only one sensor needs to transmit the data and other sensor nodes 12 should suppress their transmissions. To do this, all nearby sensor nodes 12 start by selecting a random time and setting a timer (that has a maximum bound). The sensor with the first timer expiration transmits the data. Other sensor nodes 12 listen to that transmission and register that a similar data has been transmitted to the sink (whether an aggregator node 16 or a sensor-network gateway 28) and therefore, cancel their own transmission. Sensors do not have to do this by default. Aggregator nodes 16 may implement this reduction scheme in an adaptive manner. Initially, a sensor node should not use data suppression. The aggregator node may monitor the incoming data, and if it sees similar values from multiple sensor nodes 12, it may send a control message in the network asking each sensor node to enable data suppression mechanism. In this mechanism, each sensor node listens to data broadcasts form other devices in a promiscuous mode. If a node finds that there are other sensor nodes 12 transmitting the same information, then it may trigger data transmission suppression.

In particular embodiments, the aggregator nodes may perform application-aware data compression: Aggregator nodes 16 may use application-specific data summarization techniques to drop redundant information from raw sensor data. This is not same as data compression; it is actually dropping redundant or useless information from ever being transmitted based on an application-specific mechanism. This task would simply be too computation-intensive to be executed by power-limited sensor nodes 12.

More often than not sensor nodes 12 would not report any change in data, and for most reports, the same value would be reported. This value could be analog or digital text, audio, or video data. Hence, an application level redundancy checker is needed. A simple example of data in a video format is described below. Application-specific redundancy elimination is not limited to video data, for other formats, appropriate data patterns may be recognized and stored for compression.

Time: 0-1 hr: a tree in front of a building (Nothing happens)
Time: 1-1.15 hr: a cat climbs the tree and lounges for sometime
Time: 1.15-2 hr: the cat has left and the frame reverts back to the one in time (0-1 hour) phase.

The compression technique is simple: for every new frame, the aggregator compares it to the previous one; if it is same, then the aggregator drops it. Otherwise, the aggregator compares it against a set of frames stored in a dictionary. This step identifies if the video stream falls back to a previous state. If the frame is new (meaning it does not exist in the dictionary), then the aggregator adds the new frame to the dictionary. Using this mechanism, the aggregator is able to identify that, between 0-1 hour, the video feed is roughly the same frame, (for example, F0). From 1-1.15 hr, there might be K unique frames {F1, . . . , Fn}. From 1.15-2 hour, the video feed reverts back to a frame substantially similar to frame F0. Hence, the newly created dictionary only needs to keep frames {F0, . . . , Fn} in storage. Thus, the actual content may be summarized as:

Time: 0-1 hour: F0
Time: 1-1.15 hour: {F1, . . . , Fn}
Time: 1.15-2 hour: F0

Where frames F are retrieved from the dictionary. The strength of this approach is that since decompression merely comprises dictionary look-ups, the decompression step is relatively fast. Also, this approach is different than LZ/Huffman compression since in this case, application context is used for summarization rather than raw data. During data display, this summarization may be used for an intuitive display. Each interval may use its beginning frame as a thumbnail:

Time: 0-1 hour: Thumbnail F0
Time: 1-1.15 hour: Thumbnail F1
Time: 1.15-2 hour: Thumbnail F0

When playing, the device may display frame F0 for T seconds (a small time buffer to represent 0-1 hour, 10 seconds may be), followed by frames F1, . . . Fk, and then play F0 for T seconds.

In particular embodiments, an aggregator may identify and reduce redundant energy-hogging data transmissions. The well-powered aggregator may look at various feeds and identify or verify if feeds from several sensor nodes 12 might be identical. The aforementioned techniques would allow the aggregator to detect redundancy for both property-based and non-property-based feeds. If feeds are identical, then, the aggregator may send a control message asking devices that are transmitting redundant information to pause sending identical data.

At step 304, the aggregator nodes validate the data. Sensor networks as contemplated rely on accurate consistent data, and thus maintaining data integrity is of paramount concern. Thus aggregator nodes 16 may be able to detect malicious or erroneous data transmitted from rogue sensor nodes 12 or sensor networks. In particular embodiments, aggregator node 16 utilizes a Machine Learning for Anomaly Detection in Sensor Networks using (Spatial/Domain) Correlation Sensor algorithm. Such an algorithm is able to differentiate between a faulty sensor and a rogue sensor. An aggregator node 16 may use simple machine learning tools for such validation. For example, assume a temperature sensor is under consideration. A police sensor keeps track of distributions of nearby sensor nodes 12. The temperature of a nearby sensor may not be arbitrarily different from the temperature gradient. The police sensor keeps the temperature distribution of its nearby sensor nodes 12 and records how the temperature drops off as a distance from itself. If a particular sensor X has different distribution parameters, it might be malicious with some probability which may be found through hypothesis testing. Upon detecting a malicious sensor, an aggregator node 16 could take several actions, ranging from jamming this sensor to ignoring the sensed values during in-network query processing.

At step 305, aggregator node 16 formats the sensor data for processing. An aggregator node 16 may provide several key services that may add value to data in terms of future searches. Sensors are resource-constrained and may need service-assistance from aggregator node 16 (a power device connected to the Internet). Aggregator node 16 may, as an example, stamp data with the following attributes:

Data may be stamped with an accurate time (NTP) since individual sensor nodes 12 may not have an accurate clock.

Data may be stamped with the geographic location of the sensor node or aggregator node 16. This will reduce search time in geographically-constrained searches. In order to make search and indexing more accurate, the gateway 28 or aggregator node 16 may also add text or anchor information for data using metasense capabilities.

At step 306, aggregator nodes 16 append metadata to the received sensor data for the purpose of providing efficient searches. Aggregators 16 may also convert to text to be used by indexer node 26. Sensors may send hints (for example, temperature data may be annotated with the property temperature), which aggregator nodes 16 use to generate metadata tags. The metadata tags may be dimensions in a multi-dimensional array for efficient search by indexer nodes 26. For audio data, aggregator nodes 16 may utilize speech-to-text algorithms to generate metadata. Similarly, for video data, image analysis may be used.

Aggregators 16 may use one or more tags (such as for example sensor IDs) to determine that sensor data is related to a particular sensor subject, and add the sensor subject to the metadata. As an example and not by way of limitation, aggregation system may receive one or more data sets from one or more sensor nodes 12. Sensor data in the data streams may include or have associated with it tags identifying sensor IDs of sensor nodes 12. Aggregators 16 may determine a sensor subject related to the data streams by querying the sensor IDs to a suitable record (such as for example a lookup table or index) indicating the sensor subject associated with the sensor IDs.

Aggregators 16 may also provide encryption, secure session with indexer nodes 26, firewalls, and other network components to maintain the sanctity of the underlying network as it acts as one entry point to the network. In particular embodiments, aggregator nodes 16 may perform a data integrity function on one or more data streams, such as for example by encrypting the data, using digital certificates, having the data authenticated by a third-party system, or by using trusted data collectors, wherein the sensor data is generated and data integrity is maintained through limited APIs to access the database.

For sensor data from private devices like cell-phones, PDAs, tablet PCs, and the like, aggregator nodes 16 should support anonymizing the data before it is sent out to indexing layer 204. In particular embodiments, any sensitive data that may be used to uniquely identify the generator node may be stripped off and not recorded, or summarized, or given access to in a live stream. In particular embodiments, data-aggregator nodes 16 may anonymize one or streams of sensor data, such as for example by removing information from a data stream that identifies (directly or indirectly) one or more of the subjects associated with the data set.

At step 307, aggregator node 16 appends time-stamps to the aggregated sensor data, if time-stamps are not already attached to the data. In particular embodiments, time-stamps are merely a special metadata tag. In particular embodiments, time-stamps are a special property of the data used for indexing. In particular embodiments, time-stamps may be added by both sensor nodes 212 and aggregator nodes 216.

At step 308, aggregator node 16 transmits its aggregated sensor data to indexing layer 204. This transmission may either be directly to an indexing node, or through multiple hierarchical layers of aggregator nodes 16 to an indexing node. Aggregator nodes 16 may use both push and pull models to transmit their data to indexer nodes 26. In the push model, aggregator node 16 collects information and periodically submits data in a batch to an indexer node 26. In the pull model, indexer node 26 queries indexer node 26 and requests for additional information beyond the previous batch (or batches) of information. The need for pull may be either because indexer node 26 needs additional data for a particular event beyond the provided summary, or because indexer node 26 needs a real-time input for a particular event. In particular embodiments, aggregator node 16 determines what data needs to be shared with the indexer-based on interests communicated by the user-queries from indexer 26, or based on popularity or relevance of the data. In particular embodiments, aggregator node 16 publishes necessary feeds to upward indexing engines using a distributed publish-subscribe (pub-sub) architecture. The architecture is hierarchical and at each level of hierarchy there are aggregator nodes 16 that present more collective statistics, and indexer nodes 26 look for time-based measurements and various sensor network toolboxes to determine if the sensed data is statistically significant. In particular embodiments, aggregator node 16 may also register with the search-query layer 205, and proactively identify services available with it.

Each aggregator node 16 also maintains a reliability index for use by indexer nodes 26. Each aggregator node 16 maintains a list of sensor nodes 12, their locations, capabilities, and most importantly the trust in the sensor. In particular embodiments, aggregator node 16 determines the owner of a particular sensor, and accesses a database of highly reliable organizations, such as CNN for news, the Weather Channel for weather, etc., to determine the trust level of a particular sensor or sensor network. In another embodiment, the system utilizes a self-correcting marketplace where information is selected on a weighted average system of all information available from a dense set of sensor nodes 12. The weights reflect a property of the sensor data, such as the quality and reliability of data. Thus, in particular embodiments, if two sensor nodes 12 provide the same data, but one provides a higher quality, aggregator node 16 assigns a higher weight to sensor node 12 that has higher quality data.

Indexers communicate with aggregator nodes 16 or other indexer nodes 26 on a frequent basis. Efficiency is increased through the use of adaptive, medium-lived TCP tunnels for faster data transport. Transporting massive sensor data over the Internet may need a customized transport solution to make it faster, reliable, and efficient. UDP may not be used since it does not have reliability, congestion-control, and flow-control. Without these controls, the Internet would run into congestion problems, and the receiver would run into the problem of receive buffer overflow. Thus, in particular embodiments, aggregator nodes 16 use TCP as a control protocol for communications with indexing layer 204.

One particular embodiment uses medium-lived TCP tunnels. Indexers run a modified version of TCP to retrieve data from aggregator nodes 16. Since aggregator nodes 16 send data for various requests, each aggregator node 16 may create an application running on top of TCP, and instead of closing the TCP connection, as in HTTP, keep the TCP connection open for T(t) duration, relying on the high likelihood that there would be request for sensor data in near future. T(t) may be adaptive; if network resources are low, then T(t) is decreased. If network resources are plentiful, T(t) is increased.

However, even with such an adaptive window, indexer 26 might become overloaded with a large number of lingering TCP connections. In particular embodiments, indexer 26 may take three possible actions to avoid overload. First, it may specify a maximum limit on the number of tunnels. Second, if it gets starts to approach this limit, then it may close connections that have relatively fewer requests. Third, for the case where aggregator nodes 16 may crash without gracefully closing TCP connection, indexer 26 may set TCP keepalives to clear lingering TCP connection. Application-based modifications will allow TCP connections to avoid the overhead of establishing connections (extra packets in the Internet and the delay associated with it). One advantage to keeping the connection open is that the connection may use the last congestion window and avoid the costly TCP slow-start. Traditionally, all new TCP connections start at a very low data rate ("slow start") and thus, the data is not sent at a suitable transmission rate. But, in this embodiment, retaining one TCP connection would mean avoiding frequent connection overhead and avoiding the initial low data-rate.

Indexer nodes 26 have the responsibility of organizing and indexing input sensor data from a list of aggregator nodes 16, so that when an end-user issues a search, indexer 26 may more easily efficiently do a look-up and return relevant data entries. Indexer nodes 26 collectively form an overlay search network that routes end-users search requests and data. Indexer nodes 26 may route queries between them, and ultimately route requests for data from end-users to the sensor network where the desired information is available.

Once data is collected by aggregation layer 203, characteristics of the data are identified by indexing layer 204 and metadata related to sensor data is stored in efficient data structures for future query search. In particular embodiments, indexers may form an overlay with each other, where they may communicate and transfer data of common interest. Queries from the end-users are routed to indexer nodes 26. Indexers form an overlay nodes for query routing from the end-users to the sensor network where desired information is available. Each indexer node 26 stores multiple data structures for all the sensor data available to indexer node 26. The data table or data structure contains one entry for each connected sensor network that wishes to share its data with the outside world. Each indexer node 26 is assigned geographical coordinates. An example data entry for a sensor network is described below:

Sensor-network gateway Address: Each connected sensor network is identified by its sensor-network gateway 28 address Physical/Logical coordinates of the source of data available from a desired sensor network Address Data Matrix: A matrix storing a data type and its attributes, for example: (a) Data Type 1, size per entry, raw or processed data, quality, time-duration; (b) Data Type 2, size per entry, raw or processed data, quality, time-duration Access List: Each sensor-network gateway 28 may enact a security policy, and indexer nodes 26 may store an access list that determines if data access needs to be restricted to certain end-users.

In some embodiments, each sensor network may update their entries in neighboring indexer 26 periodically or on-demand if desired. Once entries are updated in indexer nodes 26, then indexer nodes 26 may communicate with each other periodically to sync their entries. In particular embodiments, all data that is not meant to be shared is stored within a sensor network domain. Data that needs to be shared may be stored at sensor-network gateways 28, or a dedicated data repository specific to each sensor network, which may be accessed by the outside world. In other embodiments, data may be stored for offline access and may be kept outside the sensor network domain after implementing necessary security policies. In such an embodiment, indexer nodes 26 will have the information available about the offline data location. For real-time data access, queries need to eventually delivered to the actual sensor-network gateways 28 to access real-time data.

Figure 4:
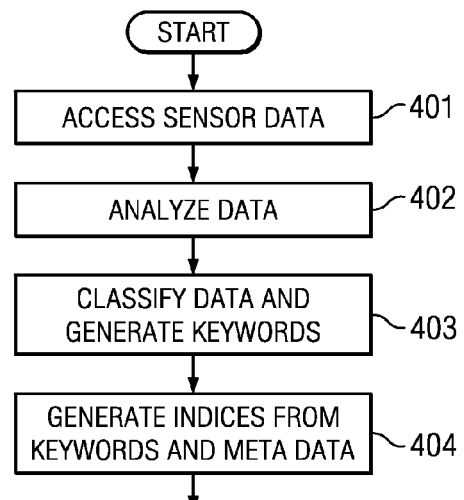
FIG. 4 illustrates an example method for indexing sensor data.

FIG. 4 illustrates an example method for indexing sensor data. At step 401, indexer node 26 receives data from an aggregator node 16. Indexer node 26 may receive the data from aggregator node 16 in response from a request for data, or indexer node 26 may have previously subscribed to all or a portion of the data aggregated by an aggregator node 16, after which aggregator node 16 actively pushes data up to indexer node 26. The primary difference between traditional indexing and indexing for sensor streams is that the data in the stream has much lower significance compared to the metadata. Therefore, the metadata is indexed, rather than the real data, because by the time the query comes, the data in the streams would have changed, but metadata has much more hysteresis and hence changes much more slowly than the real-data. Indexing real-time streams, although similar to real-time search, differs due to the streaming nature of the data. In particular embodiments, data is conveyed as a time series, using popular models such as autoregressive integrated moving average (ARIMA).

At step 402, indexer node 26 analyzes the incoming aggregated sensor data. The sensor data has already been tagged with metadata from aggregator node 16, and undergone basic summarization and classification. Various embodiments contemplate several different mechanisms for generating indices for the sensor data. In particular embodiments, data streams may be summarized by collecting the signature of the flow. In another embodiment, indexer node 26 may specify a data storage format, such as, for example, (<data type> <size per entry><raw or processed><quality><time duration.>). In particular embodiments, indexer nodes 26 employ parallel architectures such as the systolic array; each small processing unit may index independent entities. In another embodiment, a TCAM like structure may be used to perform parallel and potentially single clock cycle lookup through the index.

At step 403, indexer node 26 generates keywords for each received sensor data stream. In particular embodiments, indexer nodes 26 use metadata added by aggregator nodes 16 as keywords describing the stream. Every stream is summarized and annotated by keywords, which indexer node 26 uses as anchor keywords for inverted indices. Aggregator node 16, or, alternatively, indexer node 26 itself converts a stream into a bag of keywords based on meta-sensing classifiers. For example, if the stream is near static, indexer node 26 adds the keyword "static" to the bag of keywords for the stream. If the stream varies significantly, indexer node 26 adds the "fluctuating" keyword. For different domains, classifiers may work on this streaming data and convert it into words. Indexer nodes 26 classify the streams into keywords in a parallel fashion, and the classifiers could be described flexibly using business logic language and implemented in hardware, in parallel.

In particular embodiments, indexer nodes 26 maintain keyword frequencies by combining keywords for different time windows, thus forming a true keyword frequency distribution. Since each keyword is a single dimension, indexer node 26 may further summarize the stream by the eigenvalues in the keyword space.

At step 404, indexer nodes 26 generate indices and keywords from the metadata for each piece of accessed sensor data. In particular embodiments, indexer nodes 26 may use metasense queries for efficient indexing. For example, if a query string contains parameters that belong to a metasense table, then all the records related to that metasense can be provided as a result. An index generated for a data stream that is, itself, generated by metasense commands would create a multidimensional array including the conditions and criteria of metasense commands. For example, when indexing a stream of data generated in paragraph 42, the index could include a multidimensional array, wherein the array values are, for example: (<periodic><every 10 seconds AND Mean (lightIntensity)>100 AND Median(sound frequency >1 Khz.}). Thus metasense queries are easily matched with the data generated by metasense queries.

In particular embodiments, data may be indexed based on the properties appended to the data during the initial categorization/summarization by aggregation layer 203. Thus data may be indexed as property/non-property based data, and further, with property based data, by the data's type value or format. For non-property based data, the data may be indexed by the standardized metadata appended to the video or audio stream.

In order for indexer nodes 26 to efficiently generate searchable indices for sensor data streams, the data must be tagged and summarized by aggregator node 16. It is possible that the data being fed from an aggregator nodes 16 does not have necessary time-stamp, geo-tagging, or text-tagging. In particular embodiments, the indexer node verifies the incoming data and sends a control message to aggregator node 16 asking it to start providing data stamping. Similar logic applies for application based data summarization. An indexer node 26 may communicate with aggregator nodes 16 to enforce data summarization In particular embodiments, indexer nodes 26 may also generate indices for data based upon the reliability index of the sensor network. An aggregator node 16 maintains a trust level for each sensor based upon the owner or a "trust marketplace" as previously described, and indexer node 26 may respond to queries specifying only a trust level at, above, or below (though unlikely a query would be generated seeking untrustworthy sensor data) a specified trust level. The reliability score may be based on a variety of criteria, such as for example time lag, sampling rate, sensor reliability, sensor sensitivity, sensor type, sensor location, sensor subject type, prior history of the seller of the sensor data, a combination of two or more of these criteria, or other suitable criteria.

Particular embodiments include sensor-data redundancy for TCP connections between an aggregator node 16 and an indexer nodes 26. A set of data transmitted from aggregator node 16 to indexer node 26, called a data page, is marked by aggregator node 16 with an identifier called a short index. An aggregator node 16/sender maintains a mapping of data sent to a short index, and may determine that, if it is simply sending periodic data matching the previously sent data page, aggregator node 16 may send only the short index. Indexer node 26, upon receiving the short index, knows that the data page is already stored at indexer 26. This is known as DRE and multiple variations of DRE customized for sensor networks may be envisioned by those of ordinary skill in the art.

Figure 5:
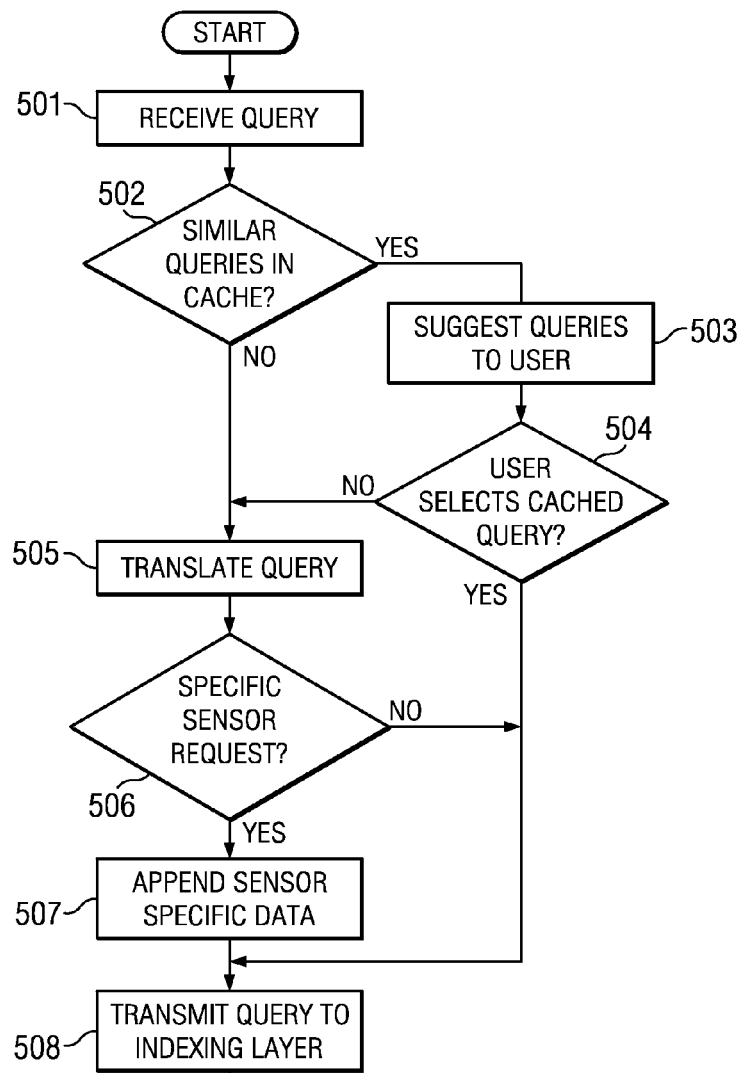
FIG. 5 illustrates an example method for generating a sensor-data query.

FIG. 5 illustrates an example method for generating a sensor-data query. Search-query layer 205 is responsible for receiving a query from an end-user or application and generating a properly formatted query that aligns with the indexing performed by indexing layer 205.

At step 501, a user issues a query to search engine 22. In particular embodiments, there are two ways query may be specified. First, query may be made through web search engine interface that enables query specification in a standardized format. Second, any two sensor networks may exchange data by querying each other by formulating query using standard APIs. A query may be sent on demand, or periodically as per the end-user requirements. In particular embodiments, end-users prepare a request for the desired data with following key attributes:

Type of data requested: Sensors streams are multi dimensional. Hence the query specifies which of the available dimensions it is interested in. For example, different sensor networks may monitor multiple environmental properties. The type of data determines different properties (temperature, humidity etc.) that are requested by the query. Standard techniques for data dimension reductions like Principal Component Analysis (PCA) may be applied for data size reduction and hence, a faster search. Standard PCA techniques are envisioned by this disclosure, including approximating a data matrix through the use of eigenvectors corresponding to the top eigenvalues of the matrix. In particular embodiments, there are two modes in which query request may be made: a search mode and get Mode: The search mode determines that end-user is searching for the indexer that has data availability information. Get mode determines request to be delivered to the final source of the data selected by the end-user.

Raw time-series data or Processed Data: A user might query for the real-time data stream or the processed data depending on the need. Processed data may be a temporal or spatial average, some kind of metadata, or any other combination. Particular embodiments may include a toolbox that may perform very fast hardware assisted statistical aggregations on data streams. In particular embodiments, statistical aggregations occur offline and are cached. In another embodiment, the statistical aggregations are generated run-time based on the user query. In particular embodiments, popular aggregations or processed data are stored locally on indexer nodes 26.

Streaming, Periodic, or One-Time data request: This attribute determines if the end-user needs streaming data, is requesting a periodic update of his query, or is requesting a one time result for his query. Specifying this ensures that the query and the results are updated as per user specification. For example, if a user desires periodic update, he/she could alternatively transmit the query periodically in order to get the search results, or, once the user has chosen the search result, the user might want to specify in his or her query that the user desires a periodic update from the same source.

Timeliness of the Data: In particular embodiments, this attribute has three possible values. The first value provides the most recent data available or (t=Tpresent), a second value specifying historical data with time range (Data between Time $T1<=t<=T2$), finally a third value provides future data with time range (Data from $Tpresent<=t<=Tmax$). In particular embodiments, the third value is the means by which a user makes a request for streaming data.

Location of Sensor network: In particular embodiments, a query may include a request only for data near a specified location. The location may be specified with logical coordinates, i.e., address of the sensor-network gateway 28, or with physical coordinates of the sensor-network gateway 28 or sensor nodes 12. In particular embodiments, the query may include an operator that provides a "best match" option: this option may be used when location of the data is not known.

In particular embodiments, the user may issue queries that do not require raw time-series data, but instead need information on specific interesting events that may happen in the sensor network. For example, a user might be interested in lightning strikes, but there is no standard query container for identifying a lightning strike. Therefore, he may seek video data when light intensity is recorded above a given threshold and is followed by sound intensity above a given threshold within ten seconds of the light intensity spike. These conditions could be formatted into a metasense query and passed to indexer nodes 26.

In particular embodiments, the users are provided with a set of application program interfaces (APIs) for query specification. A set of APIs are defined that are used by end-users to specify query for the desired information. These APIs would allow applications to directly query or to automate querying of data from various indexer nodes 26. For example, pseudo-code for functions prepare_query_Request( ), send_query_request( ), and receive_query_response( ) could be used by various applications, such as applications in a mobile phone, GPS, or other computing device, to generate and send queries or receive results.

At step 502, search engine 22 accesses a cache of popular queries. In particular embodiments, indexer nodes 26 may collectively maintain a cache for recent popular queries. In another embodiment, search engine 22 itself maintains the cache of recent popular queries.

At step 503, if search engine 22 determines that input query matches a set of recent popular queries, then search engine 22 may suggest those queries to the end-user. In particular embodiments, the queries may be presented in an ordered list. In another embodiment, they may be presented in a drop-down menu.

At step 504, if the user finds one of these queries a near-perfect or perfect match, then the user may choose the closest query. In particular embodiments, the user makes his selection through a pointing device. In another embodiment, the user makes his selection via a touch input. In another embodiment, the list of cached queries includes an option indicating that none of the suggested cached queries match the user's query. Indexer nodes 26 maintain an updated compilation of search results for some of these popular queries and serve the results to the end-user, largely reducing lookup delay. In another embodiment, search engine 22 itself maintains the updated compilation of search results for some of the popular queries. If the user selects a cached query, search engine 22 proceeds automatically to step 508. If a user does not select a cached query, then search engine 22 proceeds automatically to step 505.

At step 505, search engine 22 performs query translation from the text entered by the end-user to a format matching the indices generated by the sensor data. The translation process essentially converts the text and options selected by the user or API into a format which may be read by indexer nodes 26 within indexing layer 204. Techniques for this conversion process are well-known in the art. For example, a user may select one or more, but not all, of the data criteria described below. The user may make these selections through the use of drop-down menus, GUI buttons, and text fields for searching the sensor network. Search engine 22 converts these inputs into a query string or instruction conveying the user selections in a compact format that is understood by indexer nodes 26 within indexing layer 204.

At step 506, search engine 22 determines whether the user has requested sensor data from a specific sensor or sensor network. In particular embodiments, the user, through either the search engine or an API, may append a query with an option unique resource identifier. Every sensor network has a unique resource identifier, including but not limited to and IP address or unique name. The user has the option of including the resource identifier along with the query. Thus, get-based queries with an option unique resource identifier are directed to the specified sensor network, and an end-user may retrieve the desired data, whether real-time or stored, directly from the specified sensor network. In another embodiment, the user may browse a directory type structure to determine the list of publicly available sensor networks or if a sensor network is restricted, and filter the resulting list of matches to show only those sensor networks that should be visible to the user in addition to the publicly available sensor networks. In another embodiment, the user may specify a particular sensor or sensor network with a search engine GUI, and search engine 22 creates the option unique resource identifier. At step 507, the option unique resource identifier is appended to the query. At step 508, the translated query is transmitted to the overlay-search network provided by the network of indexer nodes 26 in indexing layer 204.

Figure 6:
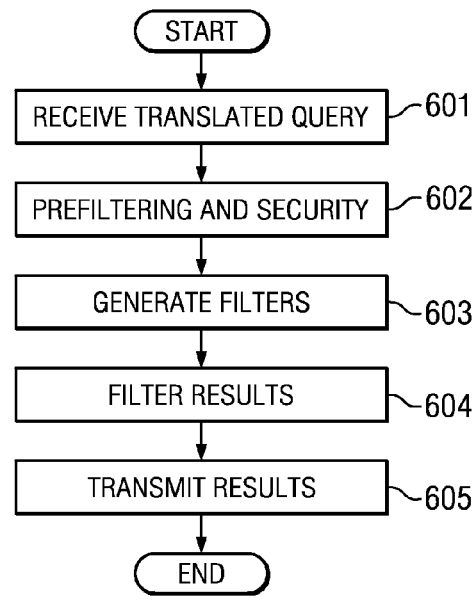
FIG. 6 illustrates an example method for retrieving sensor data in response to a sensor-data query.

FIG. 6 illustrates an example method for retrieving sensor data in response to a sensor-data query. In particular embodiments, an indexer-based overlay search network employs various mechanisms that are optimized for responding to a search query. Search engine 22 performs smart pre-filtering, and then designs a cascade of filters that progressively reduce the search space. Alternatively, the indexer-based overlay search network may perform the prefiltering and filtering. At step 601, indexing layer 204 receives the translated query from the search-query layer 205.

At step 602, the overlay search network performs prefiltering of the sensor data that may be returned to search engine 22 in response to the translated query. Prefiltering may be based, but are by no means limited to, the following Geographic security regulations: Sensor streams may be omitted during the prefiltering and ranking process based on a security policy. For example, government regulations may prohibit allowing anyone from Asia access key energy data streams. Thus, the geographical location of query entity is important and may be used to prefilter candidate streams.

Robustness against off-path attacks: If the user who is running the search requires some form of lightweight security, search engine 22, indexing layer 204, or user equipment may generate a temporary password and communicate that with indexer node 26. Indexer node 26 uses the password to provide a lightweight encryption when sending the results back to the user. Thus off-path attacks against some malicious user trying to inject bogus results into the query results are avoided.

Secure Connection for subscribed services: In some embodiments, access to certain streams of sensor data requires a paid subscription. In such an embodiment, indexer node 26 stores user information and its password; the password is be used for providing a stronger encryption (e.g. TCP MD5 connections).

At step 603, the overlay search network generates filters in accordance with the requirements of the translated query. Examples of some filters designed to reduce the data results are described below. This disclosure is by no means limited to the listed filters, and contemplates any number of varying types of data filters.

Similarity search: For a query specifying a data distribution D, find all sensor nodes 12 that have sensed data distribution similar to D, and have tags given a search tag set S. Data distributions may be temporal (i.e. based on values occurring from time=t1 to time=t2) or may be a running average (long term) based on policies and search options. For example, a user might want all sensor nodes 12 that are of type smart meters, and of type GE (made by GE) that have a voltage distribution D. In such an example, the filter designed would include search tags "GE", "SMARTMETER" and a data distribution D. The data is first reduced to a list of probables by prefiltering in the tag space, giving rise to several candidate sensor streams CS. The query system then calculates a distance metric dist(D,D_s, metric) for each data stream in CS. In particular embodiments, the metric is a KL distance. In another embodiment, the metric is a Euclidean distance. In another embodiment, the metric is a Mahalanobis distance. The distances for each sensor stream are then fed into a ranking engine.

Range Search: Filters are designed based on constraints on the ranges of attributes, and may also have distributions and keywords. In particular embodiments, indexer nodes 26 maintain spatial data structures like R trees. For example, search queries based on geographic location and radius require sensor nodes 12 to be filtered out based on their location and the query ranges in latitude, longitude, and, optionally, radius.

Query filters generated on the basis of rank, search reputation, and popularity: Query filters may be designed based on quality of the data. Data quality is determined by a composite score based on several attributes: (a) rank, (b) search reputation, (c) popularity (the number of other users accessing the data), (d) history, (e) spatial correlation with nearby sensor nodes 12, and (f) sensor owners and their attributes (based on policy).

Using meta-sensing and annotation to generate search keywords: As previously described, aggregator nodes 16 or indexer nodes 26 convert input data streams into keywords based on meta-sensing mechanisms and appended annotations. When a query is triggered, logic translates the search query into the same set of keywords so that the query may be quickly mapped to the final search data.

Categorization of input query (raw time-series or processed data) to provide easy-to-read query results: Queries may be of different types a) a user may ask for a query to be a distribution, b) time series, c) summarized time series, or d) any of a) b) or c) further augmented by attributes, tags, keywords. The response identifies the categories of data required by the query, and searches the database to respond accordingly.

Learning User preferences: In particular embodiments, indexing layer 204 may collectively learn the preferences for the user and build a profile for that user. The profile may consist of a set of keywords with a weight assigned to each. If the input query is not completely accurate, the above profile may be used to provide a more relevant response. Individual elements of this profile may be updated on a regular basis. In particular embodiments, an exponentially weighted moving average (EMWA) is used to advance the profile. Essentially, as a keyword "T" is advanced in the user profile, a large fraction from the history is kept, and a small fraction from the current search query is added. In other words, New Average of T=alpha*(Previous Average of T)+(1−alpha)*(Weight of T in the current Query). If alpha is a large value, for example, 0.90, local fluctuations in the profile may be avoided, and changes in keywords may be gradually implemented into the profile.

Using user-location to influence response to a sensor query: In particular embodiments, the search-query layer 205 or the indexing layer responds to queries based upon the location of the user. The search-query layer 205 may add user location to improve the relevance and ranking of the query results. In case of certainly, the default user location may be utilized to present relevant results. For example, if the user enters "local temperature", the latitude/longitude of the user's location may be used to present accurate temperate at the top of the results list, followed by results from other sensor nodes 12. In the absence of any other more relevant criterion, location is used to respond and provide results.

At step 604, the overlay search network applies the cascading filters to the sensor data generated by system 200. When indexed sensor data matching the query criteria are found at a particular indexer 26, the data is considered a "match." Indexer 26 indicates the sensor location and other relevant information regarding the match.

In particular embodiments, some query results are served by cached data. For example, a query requesting the average temperature of Arizona in summer may be served by purely cached data; there is no pressing need for a real-time data stream in such a query, in fact, a real-time data stream is insufficient to meet the query criteria. Of course, some queries may not be served by cached data, such as the average temperature today. Essentially, real-time queries may not be served by cached pages.

Regardless of whether the result is real-time or cached, step 605, indexer node 26 with the matching data transmits the result back to the search-query layer 205, or, alternatively, to indexer node 26 from which it received the query.

In other embodiments, the overlay search network, comprising the plurality of indexer nodes 26, perform various other functions to optimize the system 200. For example indexer nodes 26 may use search feedback to ensure high-quality data. In particular embodiments, the search-query layer 205 utilizes search feedback to adjust elements of sensor infrastructure. The search feedback is used to adjust resource allocation for sensor networks and aggregator nodes 16. Sensor networks typically use lossy wireless links and have limited battery power; if it is determined that some query has become popular and that the sensor network providing data needs assistance, then, depending upon the query result, feedback is transmitted to the relevant network.

In other embodiments, indexer node 26 analyzes the query results and provides the search feedback. If an indexer 26 analyzes that a given set of queries have become popular and if the sensor network that ultimately provides data needs assistance (in terms of battery power or better bandwidth), then depending upon the query result, it could provide a feedback aggregator node 16 and aggregator node 16 may forward it to the relevant network. For example, if the query has become popular for a particular video sensor, and if the video quality is poor, then the search-query layer 205, or, in some embodiments, indexer nodes 26 provide the feedback. Or, if the sensor network is running out of battery, an alert to aggregator node 16 of that network is triggered.

In other embodiments, indexer nodes 26 employ a power saving mechanism. For any real-time query, a given sensor may stop collecting data based on the queries. If a sensor receives a notification that there are no subscribers to some or all of the sensor data supplied by the sensor, the sensor may go to a power-save mode. For example, for security cameras, unless a RTSP streaming session is started, a camera does not produce a stream, so the encoder may be in a power save mode. The moment a query is sent to the streaming server and user selects the link, a session is created and the sensor starts producing the data stream. Thus, as connections are torn down, a individual sensor, or an entire sensor network, may enter power saving mode.

FIG. 7 illustrates an example method for presenting sensor data retrieved in response to a sensor-data query. In particular embodiments, the display of search results is carried out by search engine 22. In another embodiment, the display of search results is performed by indexing layer 204. In another embodiment, the presentation of search results to the end-user employs processing in both the search-query layer 205 and indexing layer 204.

At step 701, the search-query layer 205 receives a list of matching data from indexing layer 204. Alternatively, indexer node 26 receiving the query may obtain this list of matching data from various lower level indexer nodes 26 within Indexing layer 204.

At step 702, a stored user profile for the user issuing the query is accessed. In some embodiments, the search engine or the indexer-based overlay network may store a user profile for specific end-users, and tailor the ordering of their search results based upon their stored user profile. This is similar to a personalized search; one particular user might prefer one stream over the other, and the query system or indexer nodes 26 record this preference in the user's profile If the user runs the same query again, his history will be recalled and the stream picked the last time will have a higher ranking. Similarly, this history may be leveraged to build a user-profile and match the final results with the user-profile to ensure that result representation is closer to what a user would expect.

In another embodiment, the user profiles are maintained collectively by indexer nodes 26. This database may assist indexer nodes 26, and in turn, aggregator nodes 16 in ensuring that if they use any caching, then the weightage of elements in the caching may be adjusted by the user and query profiles. For example, if there are relatively more users who are interested in looking up at traffic condition for a given aggregator node 16 (representing an area), then that aggregator node 16 may use this information to maintain a cache of this information (instead of sending a query to the sensor network on a regular basis).

At step 703, after accessing the user profile, the search-query layer 205, or alternatively, the indexer-based overlay network sorts the results list in order of relevance to the particular user issuing the query. Multiple metrics are envisioned by the disclosure for the scoring of results. When indexer 26 presents multiple records as possible results to a query, the search-query layer 205 ranks the list of results based on certain metrics:

Available data type: in particular embodiments, results are ranked based on number of types of data available. For example, if there are two sensor streams outputting traffic speed stream data, and one of them has an associated video feed, then the one with the video feed might have higher relevance.

Real-time nature: in another embodiment, the importance of real-time data to the query is assessed and the query results scored based on which data streams best match the temporal requirements of the query. Time lag to a user might be different based on the query origination, and hence relevance will differ for the same query to different users.

Location: in other embodiments, if there are two result entries with similar relevance in terms of data type, real-time nature, history, the user's location may be utilized to determine which result should be displayed to the end-user first. This method is of particular use in the case when a sensor data is tagged with geographical location.

Result Popularity Index: in other embodiments, indexer node 26 utilizes a lightweight mechanism to mark search results in terms of their popularity (a popular search result is one which is being read by a lot of users). When a query is triggered and indexer node 26 finds that some of its results belongs to the set of popular results (news), then it may tag it with a popularity index. When presenting two entries for the search result, all other metrics being equal, then the result which is more popular may be presented first.

Furthermore, in other embodiments, the sensor data stream results may be ranked based on how any metric correlates with other metrics.

Data dimension: in other embodiments, data streams with higher dimension will be given a higher ranking. For example, the output of a temperature query might be 2 streams, one with temperature data only, the other with temperature data, wattage used, a heat map, etc. Since there are more correlated data in the second stream (which may be used to further process the raw temperature data), it will get a higher ranking.

Frequency of data: in other embodiments, data streams with a higher frequency are automatically displayed earlier in the list of matches displayed to the end-user. Higher frequencies of sensor data updates generally correlates with greater data granularity. Therefore, the ranking of data streams with a high frequency of data updates is elevated when compared to less-frequently updated data streams.

Reputation of stream originator: in other embodiments, the reputation of the stream originator determines its placement in a result list relative to other matches. The reputation of a stream originator is a function of multiple parameters, such as a database of sensor providers, the number of subscribers to the sensor stream, the number of queries served by the sensor, the consistency nearby sensor nodes 12, and the like. Exemplary factors determining the composite reputation score are described below.

User feedback: in other embodiments, a user-based review system collects user assessments of the quality of the data from a particular sensor. Such a database may be stored by the search or query system or alternatively, indexing layer 204 itself. In some embodiments, the provider of the search-query layer 205, or alternatively, a third-party, provides the sensor rating system. In addition to search, users may browse categories of networks that provide a specific sensor service and choose to subscribe or follow the one which has the best review.

How many subscribers to the stream: in some embodiments, indexer node 26 adds ancillary information to the indexed entries for each sensor network.

Stream source: In other embodiments, the source or owner of a stream may affect the reputation score of a stream of sensor data. For example, streams that are owned or operated by government agencies may have their reputation boosted.

Type of data: In particular embodiments, the data type affects the relevance of a query result to the query. For example, from the data type, the system may determine how real time the data is. For example one stream might be from a private party, but an equivalent government sensor network might have a 30 second lag, which might be unacceptable to the application. In such a case, data type would take precedence over sensor owner reputation.

The search-query layer 205, or alternatively, the indexer-based overlay search network may implement multiple methods for testing to determine the relevance of a presented result. These methods include but are not limited to: statistical testing (to determine statistically significant candidates, t-tests, ANOVA, etc. Particular embodiments determine baseline null hypotheses to determine the quality of search results. Once all these tests are done, the system calculates a composite score for each candidate query result. In particular embodiments, when forming a composite query, the system may assign weights based on targeted ads. For example, if a particular sensor stream is promoted with some advertising, then that sensor stream may be assigned a greater weight so that it appears earlier within the search results.

At step 704, after ordering the list of search results by relevance, the search-query layer 205 presents the results to the user through an Adjustable Multi-panel Result Display. The adjustable multi-panel result display may be rendered on a user display at a personal computer or other network-connected device. In particular embodiments, the multi-panel result display is rendered by the web server of the search provider. In another embodiment, the multi-panel result display is rendered by a dedicated search application running on a computing device such as a tablet or mobile phone.

The result may be rendered in several panels on the same page. The number of such panels (a square area on a displayed browser page) may be adjusted by the end-user. The result rending engine is configured to provide various panels, for example, general, news, media, popular, education, traffic, and the like. The end-user is given the option to add panels to the page. For example, if the user adds a "general" panel and a "traffic" panel, the result would divide the main page into two half-pages, either horizontally or vertically. At step 704, the search-query engine accesses a stored user profile and determines which panels the user has configured to display on his or her Adjustable Multi-panel Result Display.

At step 705, the system assigns each individual result in the ordered results list for rendering in one of the panels of adjustable multi-panel result display. For example, if the user issues a query then all the results pertaining to traffic would sit in the traffic panel and all the remaining results would sit in the general tab.

Finally, the results are rendered within the individual panels of the user's adjustable multi-panel display at step 706. In particular embodiments, smart pre-caching may be used to leverage faster response times when serving a query. For example, when a user queries for a particular data stream, the search results may display a link to the unique resource locator to the sensor data, and in the background start setting up the session for those links so that by the time the user clicks to subscribe to a stream, there are no additional latencies associated with session initialization. Such techniques are used by web pages to show images/videos In particular embodiments, the search-query layer 205 uses a location (URL)/property shortener. Since the amount of information displayed with each sensor result could be large, the query and search engine may shorten the URL of a sensor network location, and associate it with property specific to the sensor networks. This service may be provided by a third-party, and operate in a similar fashion to that of bit.ly or tinyurl.com, but is differs in that the system, in addition to crunching the URL, takes the user directly to the service, stores data type, location, and various other services associated with the service. Clicking on the shortened location URL directly takes the user to the service offered by the sensor network and not the HTTP page for the sensor network. In another embodiment, ancillary information may be displayed in multiple ways. As an example, if user rolls his or her mouse cursor over the URL, then the web page displays the relevant properties of that sensor network in a tab.

In another embodiment, when a sensor stream is presented, the query-search layer 205 will output the number of subscribers to the source as a measure of the 'strength' of the source. The system may also present a time variance of the distribution of this list, just so that the sensor stream is not caught at an off-peak hours. The strength may be presented as a simple color bar ranging from red to yellow to green as a visual representation for quicker understanding of strength.

In other embodiments, the user is provided an option, after running a predetermined number of queries, to mark some sources as favorites. If these sources subscribe to other sources, the user is given an indication of the source's new subscription when presenting search query results. In another embodiment, when well-known sites, such as CNN or BBC, subscribe to a stream, an indication is shown as an icon by the side of the result. In another embodiment, the search engine is coupled to a number of social networking sites; if the user has friends in a social network that subscribe to some sensor streams, the subscribed streams are marked in the output to guide the user.

In another embodiment, the search engine provides functionality to allow an end-user to flag sensor networks as malicious or inappropriate. "Flag as in-appropriate" is a well-known mechanism to sift through bad websites. This mechanism differs from the user rating system as described above, in that a user is claiming that the stream is malicious or might be installing spyware and such, as opposed to posting a subjective rating of the data quality. Such streams may be handled through something similar to a phishing filter.

In another embodiment, the system utilizes a search API for subscription-based searches. Traditionally, searches are monetized through advertisements; it would be unprofitable for a search engine to provide a search API that does not allow advertising. However, if a particular service permits a user to pay for a subscription to access data, where a user is interested in monitoring, interacting, etc with a set of sensor networks, then indexer nodes 26 may also provide a search API, where the results of a query may be provided in the form of a text file. In particular embodiments, the user triggers the API by specifying keywords, number of pages and a file where the search engine would dump all the results. An example of pseudo-code is provided below:

```
file = open("users/foo_name/results.txt");
num_of_pages = 100
sensor_search_api(file, "traffic on interstate 80", num_of_pages)
```

Since this results (being in a format of a text file) may be parsed by a computer, this approach might be more powerful and has the potential of quickly parsing several hundreds of pages looking for the needle in the proverbial haystack.

In particular embodiments, the search-query layer 205 is capable of building scalable dynamic query containers on the run-time. Using these containers, it is possible to compress a whole set of popular information into one small, typed value. For example, if a request that seeks to know about temperature and humidity in last 5 days becomes popular, then either the search-query layer 205 or indexing layer 204 assigns a standard index to this request. For example, index_n. Next, if a user issues a query with index_n for a location X, then the system immediately knows what the parameters the user is trying to search for, and the amount of data needed to convey this query is largely decreased. In particular embodiments, users, engineers and even indexer nodes 26 may propose and design such query containers. Indexer 26 may periodically publish a high level overview of some of the popular queries and engineers/users may use a publicly available API to build and standardize these queries.

In particular embodiments, the search-query layer 205 may be optimized through the implementation of compound queries. Since indexer nodes 26 form an overlay, the architecture may benefit by using information from various indexer nodes 26 in building a compound query. In a compound query, there may be multiple locations of interest, and the user might be interested in knowing a certain property (or a set of properties) for all of the multiple locations. For example, if a user is traveling from San Jose to Burbank (LA), then he or she may issue a query about temperature, traffic, air-pollution, and rain for the entire route. A set of indexer nodes 26 that have data for various locations in this route may report their own information and, in the end, one of indexer nodes 26 may aggregate this information into one data structure and present it to the user. Thus, the user does not have to type in information for each place separately. As another example, if the user is planning on taking Interstate I-5, then this query may present traffic (current and predicted) for entire route along I-5. Similarly, if a user is interested in organizing an event that has multiple locations, he or she may simply input those locations, and the overlay of indexer nodes 26 will be able to coordinate among themselves to provide the information of interest for all of these locations one page.

FIG. 8 illustrates an example communication flow for collecting, aggregating, indexing, and querying sensor data. At step 801, the query is routed from the end-user to the query engine, either through a search engine GUI, or through a program running a search API. At step 802, the query is routed to indexing layer 204 to determine what indexer node 26 (and, by extension, aggregator node 16 and sensor network) possesses data matching the query specifications. Indexers 26 also sync all their records with its neighboring indexer nodes 26, which enables the routing algorithm to efficiently deliver the end-user data search request to the appropriate indexer 26. In particular embodiments, queries are routed over the indexer-based overlay search network, regardless of whether the query is user-generated or is generated by another indexer node 26. If physical coordinates are specified by the query request, geographical routing is used to search the information within the indexer-based overlay network. Alternatively, when the logical address of the information is known beforehand, then query is routed to the overlay network using IP for routing.

At step 802, the query is routed to an indexer node 26 that possesses indexed sensor data that meets the query specifications. In particular embodiments, indexer node 26 has the sensor data specified by the query. In another embodiment, indexer node 26 merely possesses the location of sensor networks that have data meeting the query specification; the actual data generated by sensor network is stored within the sensor network secured central data repository. At step 806, the metadata information corresponding to the available data is first delivered to search engine 22. In particular embodiments, the query is formulated such that data from multiple sensor networks may the criteria, and moreover, multiple indexer nodes 26 may be contacted for a single query. Each of indexer nodes 26 transmits metadata to the query generator about its available data.

In particular embodiments, in-network processing may be performed to quantify the quality of the data. Indexers perform such in-network processing and collaborate with each other to rank data quality available from different sensor networks. When an end-user search request finds the requested data information in an indexer node 26, the system determines a match. It is possible to have multiple matches, i.e., same data may be available from the multiple sensor networks deployed in the same geographical region. Although the same data is available from multiple sources, the quality of the data may vary. Additionally, at step 806, the metadata for the matching information is provided back to search engine 22 along with quality of the data metrics. In particular embodiments, indexer node 26 returns the physical or logical name of the sensor network providing the matching data. Indexer node 26 has the responsibility to evaluate the quality of the data when the same data is available from multiple sources/sensor networks. In particular embodiments, indexer nodes 26 may use reliability/timeliness of the data as one parameter to determine quality.

At step 807, a ranked list of all the matching data is presented to the end-user. Since sensor data may vary immensely in nature, both in terms of the type of data (temperature, humidity, video, etc) and in terms of the granularity for the data, if a time-scaled query is involved (real-time data, average data, etc). With such a huge variance in sensor data, it is useful to guide the end-user in not only framing the query but also in presentation of the query results. Effective presentation of search results helps in two ways. First, the user does not have to tediously browse pages of less relevant results. Second, with ineffective representation, the result that the user is looking for might be buried in the 20th instead of the first page. A poor experience with result browsing might result in the final product becoming less popular.

At step 808, once the end-user is presented with the choices of the search results, the end-user may explicitly decide to retrieve a specific stream of data by selecting the appropriate indexer node 26 and sensor network location that has the desired data. The initial query 801 is sent with Mode set to Search Mode. Once data availability is identified by the query routing infrastructure, the end-user initiates actual data transfer from the source by sending another query with Mode set to Get Mode to the specific source of the data directly (step 808). At step 809 the sensor data requested by query 808 is delivered to the end-user.

Systems and methods of implementing an incentive system for sensor nodes 12 (through their gateways 28) to willingly participate in the system is disclosed herein. The sensor system essentially implements a virtual marketplace where everyone may sell their information. In particular embodiments, an incentive and penalty system is implemented to incentivize participants based on the usability and accuracy of their data, and penalize participants for providing inaccurate information. The system, on the other end, also includes a system to pay for using the search queries. In particular embodiments, a 2 tier model is used. At tier-1, old information from the database or information that is too expensive to be validated by an information broker may be provided free of charge to regular consumers; the cost may be covered through the use of advertisements. At tier-2, highly useful, validated information with high reliability index is sold or auctioned in real-time to Sophisticated Consumers. In another embodiment, this tier could also use subscription model.

An alternative monetization scheme as envisioned by the disclosure is a business model where Service Providers, such as AT&T, are empowered by a central networking and search provider, such as Cisco, to collect and validate sensor information from participatory sensor nodes 12 (such as cell phones, Call Data Records, Cell Towers, Femto Cells, etc). In particular embodiments, the system provides incentives for the participatory sensor participants (mobile users etc) to share information with Service Providers. The monetization model essentially allows Service Providers to share sensor data collected by its customers globally without providing private information about the participants who provide the information.

Figure 9:
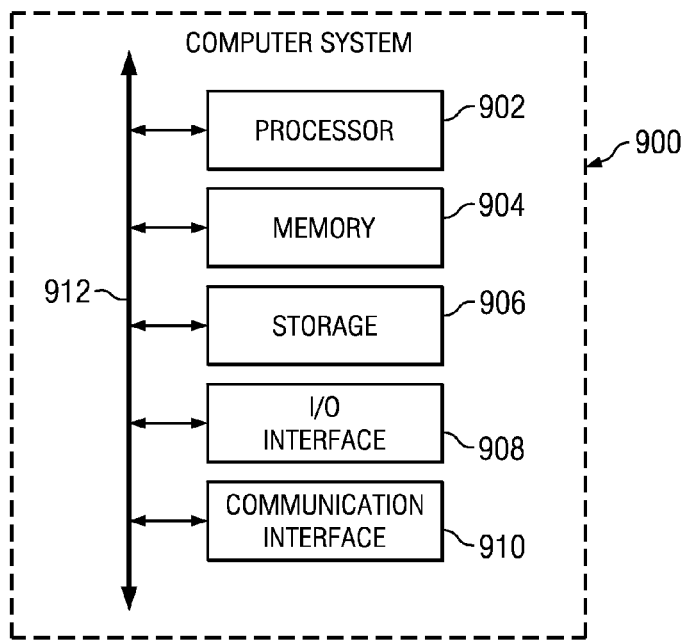
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple datacenters; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include an HDD, a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 909. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensor nodes 12. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 902 (such as, for example, one or more internal registers or caches), one or more portions of memory 904, one or more portions of storage 906, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

Figure 10:
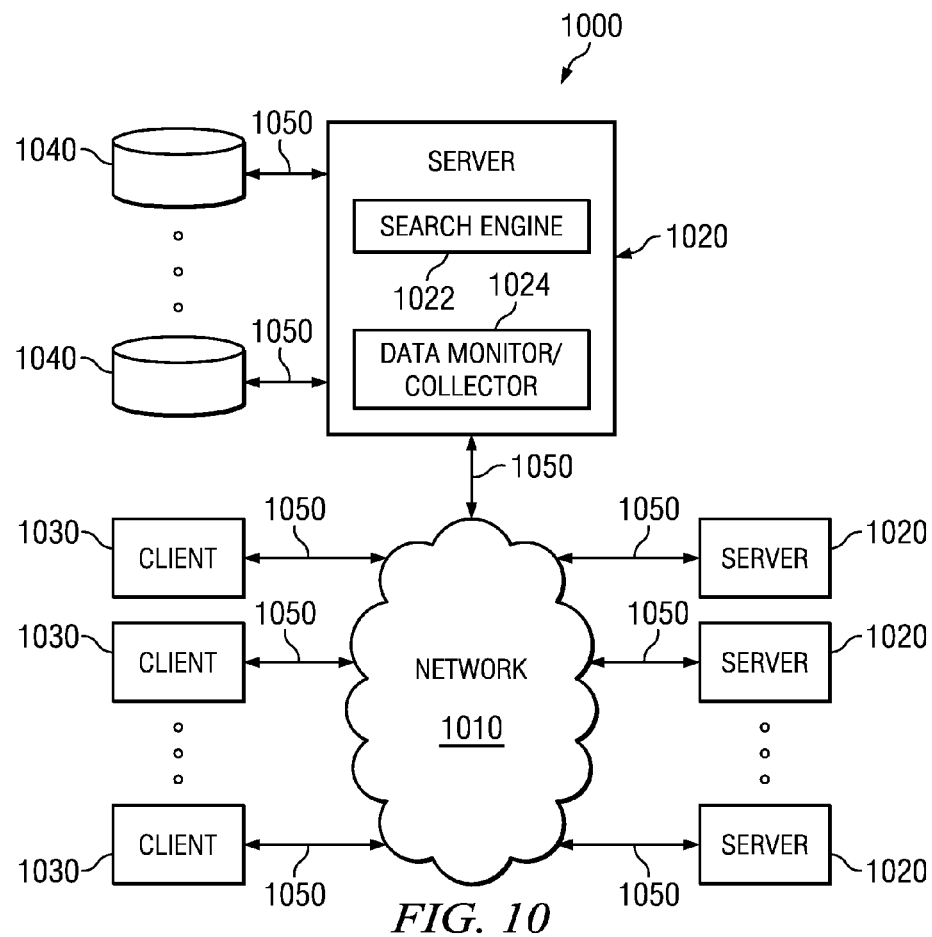
FIG. 10 illustrates an example network environment.

FIG. 10 illustrates an example network environment 1000. This disclosure contemplates any suitable network environment 1000. As an example and not by way of limitation, although this disclosure describes and illustrates a network environment 1000 that implements a client-server model, this disclosure contemplates one or more portions of a network environment 1000 being peer-to-peer, where appropriate. Particular embodiments may operate in whole or in part in one or more network environments 1000. In particular embodiments, one or more elements of network environment 1000 provide functionality described or illustrated herein. Particular embodiments include one or more portions of network environment 1000. Network environment 1000 includes a network 1010 coupling one or more servers 1020 and one or more clients 1030 to each other. This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 couple servers 1020 and clients 1030 to network 1010 or to each other. This disclosure contemplates any suitable links 1050. As an example and not by way of limitation, one or more links 1050 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 1050. In particular embodiments, one or more links 1050 each includes an intranet, an extranet, a VPN, a LAN, a WLAN, a WAN, a MAN, a communications network, a satellite network, a portion of the Internet, or another link 1050 or a combination of two or more such links 1050. Links 1050 need not necessarily be the same throughout network environment 1000. One or more first links 1050 may differ in one or more respects from one or more second links 1050.

This disclosure contemplates any suitable servers 1020. As an example and not by way of limitation, one or more servers 1020 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 1020 includes hardware, software, or both for providing the functionality of server 1020. As an example and not by way of limitation, a server 1020 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 1030, the web server may communicate one or more such files to client 1030. As another example, a server 1020 that operates as a mail server may be capable of providing e-mail services to one or more clients 1030. As another example, a server 1020 that operates as a database server may be capable of providing an interface for interacting with one or more data stores (such as, for example, data stores 10100 described below). Where appropriate, a server 1020 may include one or more servers 1020; be unitary or distributed; span multiple locations; span multiple machines; span multiple datacenters; or reside in a cloud, which may include one or more cloud components in one or more networks.

In particular embodiments, one or more links 1050 may couple a server 1020 to one or more data stores 1040. A data store 1040 may store any suitable information, and the contents of a data store 1040 may be organized in any suitable manner. As an example and not by way or limitation, the contents of a data store 1040 may be stored as a dimensional, flat, hierarchical, network, object-oriented, relational, XML, or other suitable database or a combination or two or more of these. A data store 1040 (or a server 1020 coupled to it) may include a database-management system or other hardware or software for managing the contents of data store 1040. The database-management system may perform read and write operations, delete or erase data, perform data deduplication, query or search the contents of data store 1040, or provide other access to data store 1040.

In particular embodiments, one or more servers 1020 may each include one or more search engines 1022. A search engine 1022 may include hardware, software, or both for providing the functionality of search engine 1022. As an example and not by way of limitation, a search engine 1022 may implement one or more search algorithms to identify network resources in response to search queries received at search engine 1022, one or more ranking algorithms to rank identified network resources, or one or more summarization algorithms to summarize identified network resources. In particular embodiments, a ranking algorithm implemented by a search engine 1022 may use a machine-learned ranking formula, which the ranking algorithm may obtain automatically from a set of training data constructed from pairs of search queries and selected Uniform Resource Locators (URLs), where appropriate.

In particular embodiments, one or more servers 1020 may each include one or more data monitors/collectors 1024. A data monitor/collection 1024 may include hardware, software, or both for providing the functionality of data collector/collector 1024. As an example and not by way of limitation, a data monitor/collector 1024 at a server 1020 may monitor and collect network-traffic data at server 1020 and store the network-traffic data in one or more data stores 1040. In particular embodiments, server 1020 or another device may extract pairs of search queries and selected URLs from the network-traffic data, where appropriate.

This disclosure contemplates any suitable clients 1030. A client 1030 may enable a user at client 1030 to access or otherwise communicate with network 1010, servers 1020, or other clients 1030. As an example and not by way of limitation, a client 1030 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 1030 may be an electronic device including hardware, software, or both for providing the functionality of client 1030. As an example and not by way of limitation, a client 1030 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 1030 may include one or more clients 1030; be unitary or distributed; span multiple locations; span multiple machines; span multiple datacenters; or reside in a cloud, which may include one or more cloud components in one or more networks.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computer systems:
   from an indexer in a sensor network, accessing a set of sensor data that comprises:
      a plurality of sensor data aggregated together from a plurality of sensors in the sensor network;
      one or more time stamps for the sensor data; and
      metadata for the sensor data identifying one or more pre-determined attributes of the sensor data;
   at the indexer,
      generating an index of the set of sensor data according to a multi-dimensional array configured for querying of the set of sensor data along with a plurality of other sets of sensor data, one or more first ones of the dimensions of the multi-dimensional array comprising time and one or more second ones of the dimensions of the multi-dimensional array comprising one or more of the pre-determined sensor-data attributes;
      classifying the sensor data;
      based on the classification, generating keywords for the sensor data using the metadata;
      forming a keyword frequency distribution by combining the keywords for different time windows; and
      summarizing the sensor data by eigenvalues of an array associated with the sensor data in a keyword space and generating, using the eigenvalues, a set of searchable sensor data that represents the sensor data and has a smaller size than the sensor data; and
   from the indexer, communicating the index of the set of sensor data in response to one or more queries of the set of sensor data along with a plurality of other sets of sensor data, and
   wherein generating the index comprises inputting the sensor data to a state machine with programmable rule criteria that is configured to drop sensor data that fail to meet the rule criteria as programmed.

2. The method of claim 1, wherein aggregation of the sensor data comprised:
   deduplicating the sensor data;
   validating the sensor data to block malicious data from reaching the indexer;
   formatting the sensor data for processing of the sensor data at the indexer;

generating the metadata for the sensor; and
generating the time-stamps for the sensor data.

3. The method of claim 1, wherein the metadata comprises one or more identifiers designating one or more data types of the sensor data.

4. The method of claim 1, wherein the sensor data comprises one or more streams of real-time streaming sensor data.

5. The method of claim 4, wherein generating the index comprises representing each of the streams as a time-series of data for indexing.

6. One or more computer-readable non-transitory storage media embodying software that is configured when executed to:
  access a set of sensor data that comprises:
    a plurality of sensor data aggregated together from a plurality of sensors in the sensor network;
    one or more time stamps for the sensor data; and
    metadata for the sensor data identifying one or more pre-determined attributes of the sensor data;
  generate an index of the set of sensor data according to a multi-dimensional array configured for querying of the set of sensor data along with a plurality of other sets of sensor data, one or more first ones of the dimensions of the multi-dimensional array comprising time and one or more second ones of the dimensions of the multi-dimensional array comprising one or more of the pre-determined sensor-data attributes;
  classify the sensor data;
  based on the classification, generate keywords for the sensor data using the metadata;
  form a keyword frequency distribution by combining the keywords for different time windows;
  summarize the sensor data by eigenvalues of an array associated with the sensor data in a keyword space and generate, using the eigenvalues, a set of searchable sensor data that represents the sensor data and has a smaller size than the sensor data;
  communicate the index of the set of sensor data in response to one or more queries of the set of sensor data along with a plurality of other sets of sensor data, and
  wherein generating the index comprises inputting the sensor data to a state machine with programmable rule criteria that is configured to drop sensor data that fail to meet the rule criteria as programmed.

7. The media of claim 6, wherein aggregation of the sensor data comprised:
  deduplicating the sensor data;
  validating the sensor data to block malicious data from reaching the indexer;
  formatting the sensor data for processing of the sensor data at the indexer;
  generating the metadata for the sensor; and
  generating the time-stamps for the sensor data.

8. The media of claim 6, wherein the metadata comprises one or more identifiers designating one or more data types of the sensor data.

9. The media of claim 6, wherein the sensor data comprises one or more streams of real-time streaming sensor data.

10. The media of claim 9, wherein generating the index comprises representing each of the streams as a time-series of data for indexing.

11. An apparatus comprising:
  one or more communication interfaces;
  one or more memory devices containing one or more instructions for execution by one or more processing devices; and
  the processing devices, configured when executing the instructions to:
    access a set of sensor data that comprises:
      a plurality of sensor data aggregated together from a plurality of sensors in the sensor network;
      one or more time stamps for the sensor data; and
      metadata for the sensor data identifying one or more pre-determined attributes of the sensor data;
    generate an index of the set of sensor data according to a multi-dimensional array configured for querying of the set of sensor data along with a plurality of other sets of sensor data, one or more first ones of the dimensions of the multi-dimensional array comprising time and one or more second ones of the dimensions of the multi-dimensional array comprising one or more of the pre-determined sensor-data attributes;
    classify the sensor data;
    based on the classification,
      forming a keyword frequency distribution by combining the keywords for different time windows;
      summarizing the sensor data by eigenvalues of an array associated with the sensor data in a keyword space and generating, using the eigenvalues, a set of searchable sensor data that represents the sensor data and has a smaller size than the sensor data; and
    communicate the index of the set of sensor data in response to one or more queries of the set of sensor data along with a plurality of other sets of sensor data, and
    wherein generating the index comprises inputting the sensor data to a state machine with programmable rule criteria that is configured to drop sensor data that fail to meet the rule criteria as programmed.

12. The apparatus of claim 11, wherein the aggregation of the sensor data comprised:
  deduplicating the sensor data;
  validating the sensor data to block malicious data from reaching the indexer;
  formatting the sensor data for processing of the sensor data at the indexer;
  generating the metadata for the sensor; and
  generating the time-stamps for the sensor data.

13. The apparatus of claim 11, wherein the metadata comprises one or more identifiers designating one or more data types of the sensor data.

14. The apparatus of claim 11, wherein the sensor data comprises one or more streams of real-time streaming sensor data.

15. The apparatus of claim 14, wherein generating the index comprises representing each of the streams as a time-series of data for indexing.

16. A system comprising, by one or more computer systems:
  means for accessing a set of sensor data that comprises:
    a plurality of sensor data aggregated together from a plurality of sensors in the sensor network;
    one or more time stamps for the sensor data; and
    metadata for the sensor data identifying one or more pre-determined attributes of the sensor data;
  means, including a processor, for generating an index of the set of sensor data according to a multi-dimensional array configured for querying of the set of sensor data along with a plurality of other sets of sensor data, one or more first ones of the dimensions of the multi-dimensional array comprising time and one or more second ones of the dimensions of the multi-dimensional array comprising one or more of the pre-determined sensor-data attributes;

means for classifying the sensor data;
means for, based on the classification, generating keywords for the sensor data using the metadata;
means for forming a keyword frequency distribution by combining the keywords for different time windows;
means for summarizing the sensor data by eigenvalues of an array associated with the sensor data in a keyword space and generating, using the eigenvalues, a set of searchable sensor data that represents the sensor data and has a smaller size than the sensor data;
means for communicating the index of the set of sensor data in response to one or more queries of the set of sensor data along with a plurality of other sets of sensor data, and
wherein generating the index comprises inputting the sensor data to a state machine with programmable rule criteria that is configured to drop sensor data that fail to meet the rule criteria as programmed.

17. The system of claim 16, wherein the aggregation of the sensor data comprised:
    deduplicating the sensor data;
    validating the sensor data to block malicious data from reaching the indexer;
    formatting the sensor data for processing of the sensor data at the indexer;
    generating the metadata for the sensor; and
    generating the time-stamps for the sensor data.

18. The system of claim 16, wherein the metadata comprises one or more identifiers designating one or more data types of the sensor data.

19. The system of claim 16, wherein the sensor data comprises one or more streams of real-time streaming sensor data.

20. The system of claim 19, wherein generating the index comprises representing each of the streams as a time-series of data for indexing.

* * * * *